US010739379B2

(12) United States Patent
Qian et al.

(10) Patent No.: US 10,739,379 B2
(45) Date of Patent: Aug. 11, 2020

(54) METHODS FOR DESIGNING AND PROCESSING A MICROCANTILEVER-BASED PROBE WITH AN IRREGULAR CROSS SECTION APPLIED IN AN ULTRA-LOW FRICTION COEFFICIENT MEASUREMENT AT A NANOSCALE SINGLE-POINT CONTACT

(71) Applicants: Southwest Jiaotong University, Chengdu (CN); Tsinghua University, Beijing (CN)

(72) Inventors: Linmao Qian, Chengdu (CN); Liang Jiang, Chengdu (CN); Bin Lin, Chengdu (CN); Jianbin Luo, Beijing (CN); Yushan Chen, Chengdu (CN); Bin Li, Chengdu (CN)

(73) Assignees: Southwest Jiaotong University, Chengdu (CN); Tsinghua University, Beijing (CN)

( * ) Notice: Subject to any disclaimer, the term of this patent is extended or adjusted under 35 U.S.C. 154(b) by 0 days.

(21) Appl. No.: 16/290,981

(22) Filed: Mar. 4, 2019

(65) Prior Publication Data
US 2019/0204353 A1 Jul. 4, 2019

Related U.S. Application Data

(63) Continuation-in-part of application No. PCT/CN2017/109864, filed on Nov. 8, 2017.

(30) Foreign Application Priority Data

Oct. 30, 2017 (CN) .......................... 2017 1 1033488

(51) Int. Cl.
*G01Q 70/16* (2010.01)
*G01Q 70/10* (2010.01)
(Continued)

(52) U.S. Cl.
CPC ............. *G01Q 70/16* (2013.01); *G01N 19/02* (2013.01); *G01Q 60/26* (2013.01); *G01Q 70/10* (2013.01)

(58) Field of Classification Search
CPC ........ G01N 19/02; G01Q 70/10; G01Q 70/16; G01Q 60/24
See application file for complete search history.

(56) References Cited

U.S. PATENT DOCUMENTS 9,612,258 B2 * 4/2017 Hantschel .............. G01Q 70/16
10,527,645 B2 * 1/2020 Walter ................... G01Q 60/40
(Continued)

FOREIGN PATENT DOCUMENTS

| CN | 104071746 A | 10/2014 |
|---|---|---|
| CN | 104749400 A | 7/2015 |

(Continued)

OTHER PUBLICATIONS

Reinstädtler, M., et al. "Imaging and measurement of elasticity and friction using the TRmode." Journal of Physics D: Applied Physics 38.18 (2005): R269. (Year: 2005).*

(Continued)

*Primary Examiner* — Wyatt A Stoffa
(74) *Attorney, Agent, or Firm* — Bayramoglu Law Offices LLC

(57) ABSTRACT

A method for designing and processing a microcantilever-based probe with an irregular cross section applied in the ultra-low friction coefficient measurement at a nanoscale single-point contact includes: first, establishing a universal theoretical model of the friction coefficient measurement; then, combined with the structural features of the microcantilever-based probe with the irregular cross section, establishing a specific theoretical model of the friction coefficient measurement suitable for the microcantilever-based probe with the irregular cross section; and based on above, combined with constraint conditions such as the friction coefficient resolution, the loadable maximum positive pressure or the measurable minimum friction force, and the atomic force microscope characteristics, etc., designing the microcantile- (Continued)

ver-based probe with the irregular cross section meeting the measurement requirements.

20 Claims, 9 Drawing Sheets

(51) Int. Cl.
*G01N 19/02* (2006.01)
*G01Q 60/26* (2010.01)

(56) References Cited

U.S. PATENT DOCUMENTS

| | | | |
|---|---|---|---|
| 2011/0055987 A1* | 3/2011 | Moldovan | B82Y 35/00 850/40 |
| 2012/0047610 A1* | 2/2012 | Kim | G01Q 70/10 850/6 |
| 2015/0185249 A1* | 7/2015 | Hantschel | G01Q 70/16 850/59 |
| 2019/0094265 A1* | 3/2019 | Sahin | G01Q 10/065 |

FOREIGN PATENT DOCUMENTS

| | | |
|---|---|---|
| CN | 106526242 A | 3/2017 |
| CN | 107085127 A | 8/2017 |
| JP | 2000258331 A | 9/2000 |
| JP | 2011038851 A | 2/2011 |
| WO | 2016085989 A1 | 6/2016 |

OTHER PUBLICATIONS

Haifei Bao et al., Lateral Force Calibration of Micro-Cantilever/Tip in Atomic Force Microscopy,Journal of Test and Measurement Technology, Dec. 31, 2015, vol. 19, No. 1.
Bin Miao et al., Design and fabrication of Millimeter Scale Cantilever-type Sensors for Passive Micro Force Calibration, Piezoelectrics & Acoustooptics, Aug. 31, 2016, vol. 38, No. 4, pp. 562-565.
Yaqi Shao et al.,In-plane Bending Performance Test of Micro-Cantilever Based on Whole-Field Displacement Measuring Technique, Journal of experimental mechanics, Aug. 31, 2014, vol. 29, No. 4, pp. 442-446.

* cited by examiner

Hollow rectangular cross section
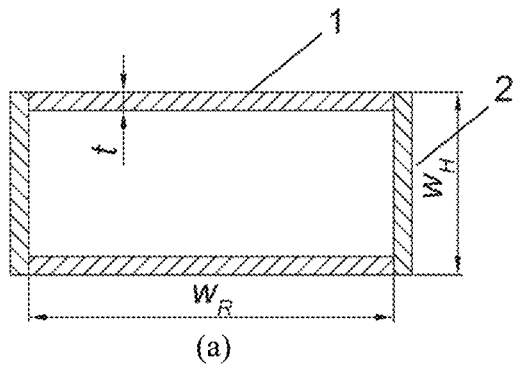
(a)
I-shaped cross section
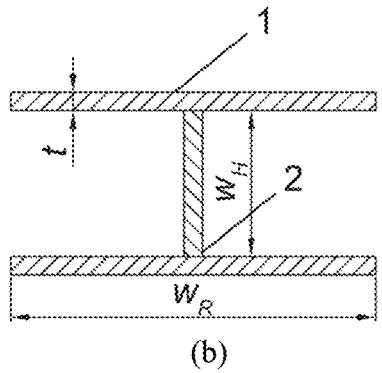
(b)
H-shaped cross section
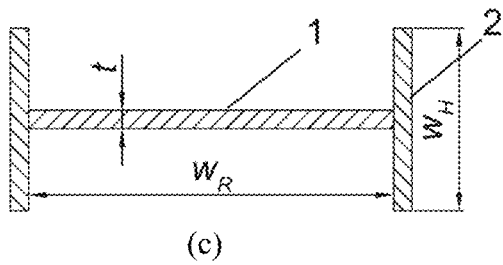
(c)
Inverted T-shaped cross section
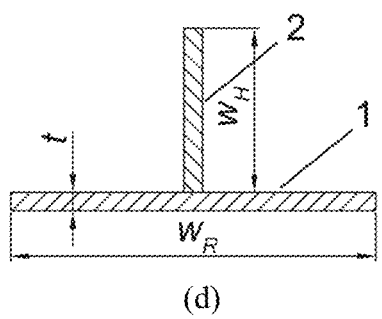
(d)
U-shaped cross section
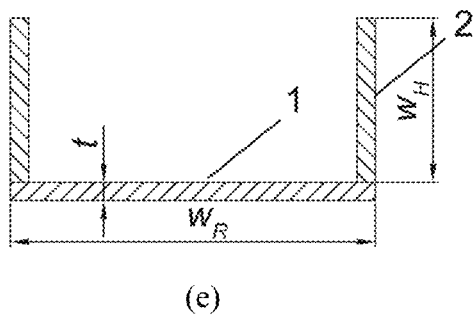
(e)
Fig. 3

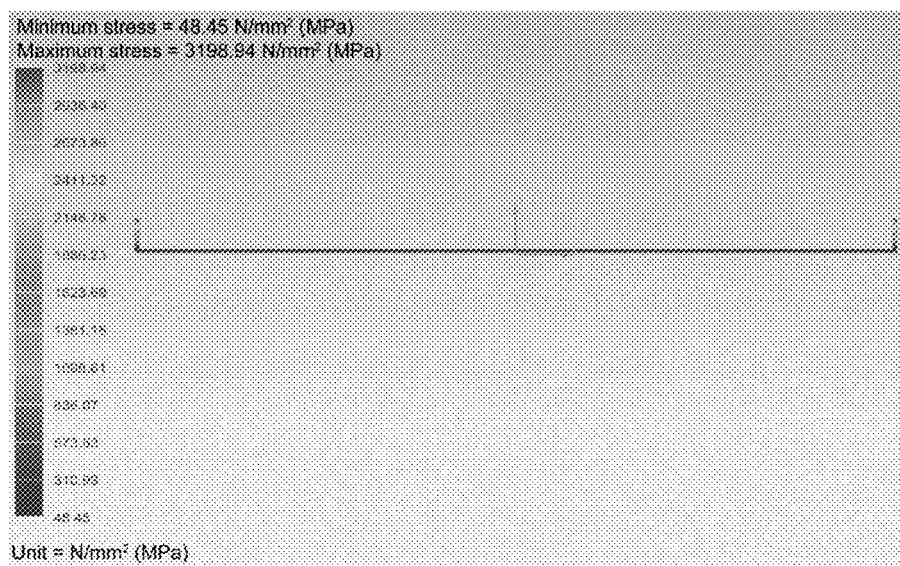
(a)
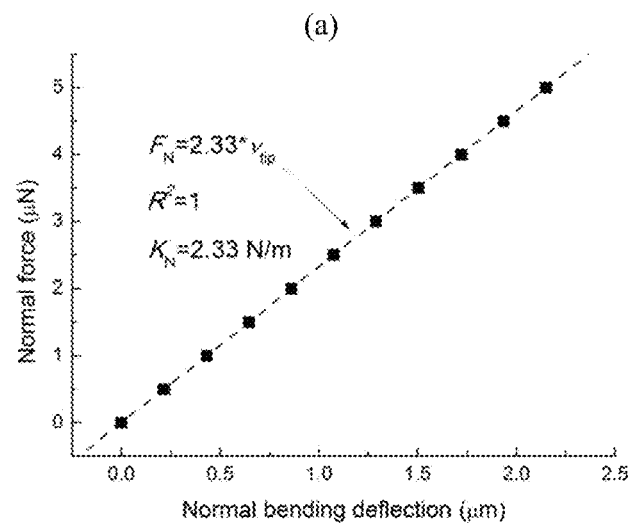
(b)
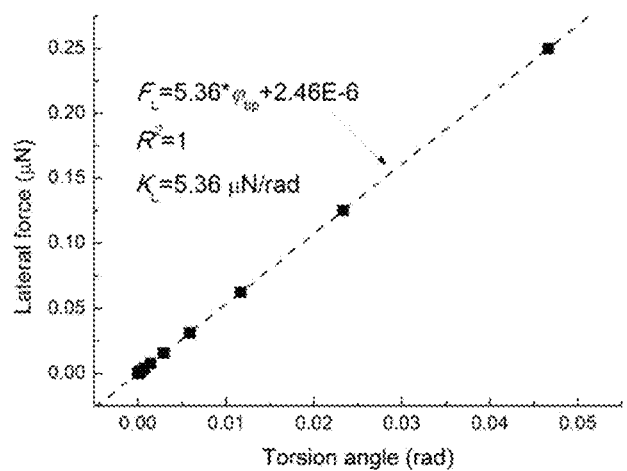
(c)
Fig. 4

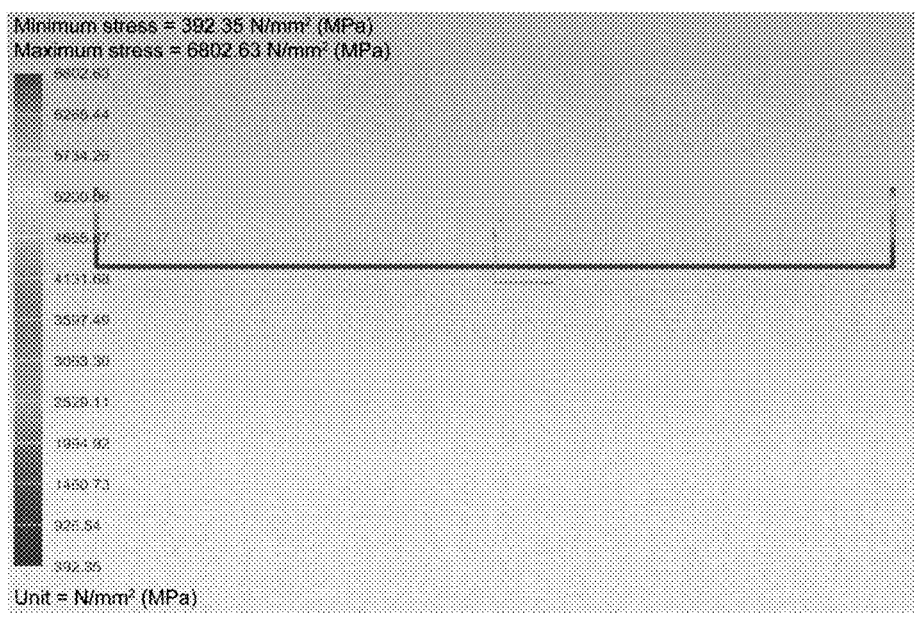
(a)
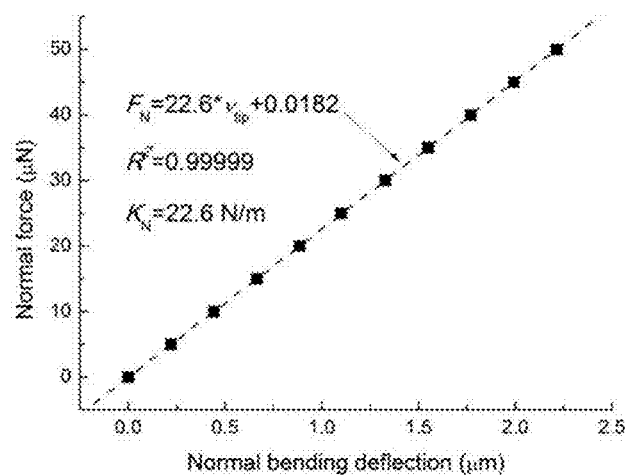
(b)
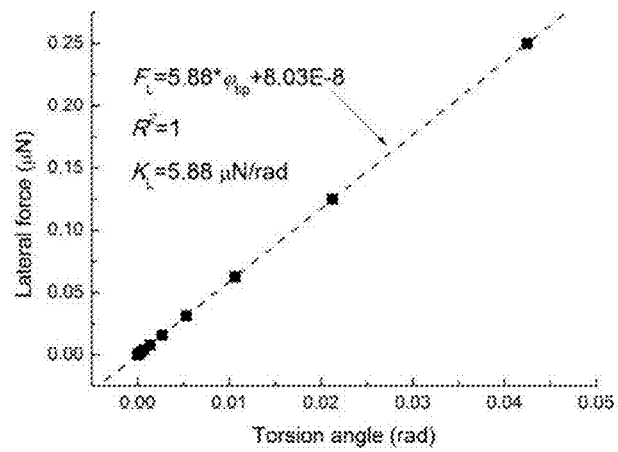
(c)
Fig. 5

(a) Prepare two raw microcantilevers and use focused ion beam milling technique to process one and fabricate the beam for supporting and fixing

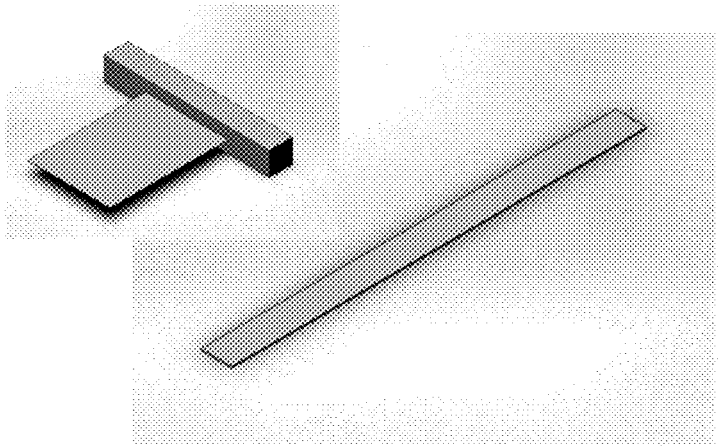

(b) Use focused ion beam deposition technique to attach the beam for supporting and fixing to the beam for reflecting laser of another unprocessed raw microcantilever, and finish the fabrication of a designed microcantilever

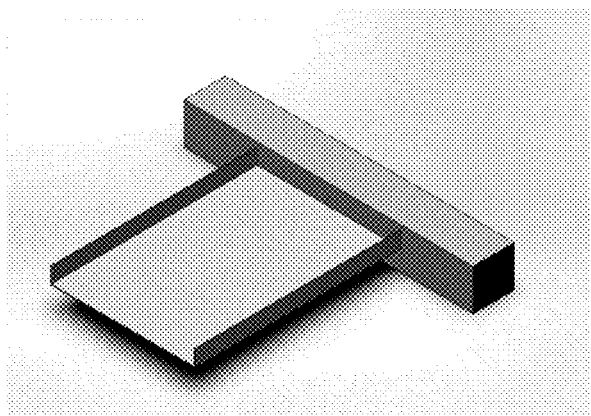

(c) Use appropriate glue to bond the tip to the end of the microcantilever, and finish the fabrication of a designed AFM probe

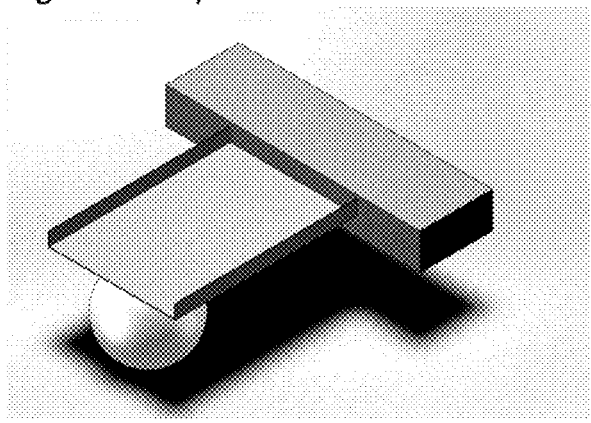

Fig. 6

(a) Prepare one raw microcantilever
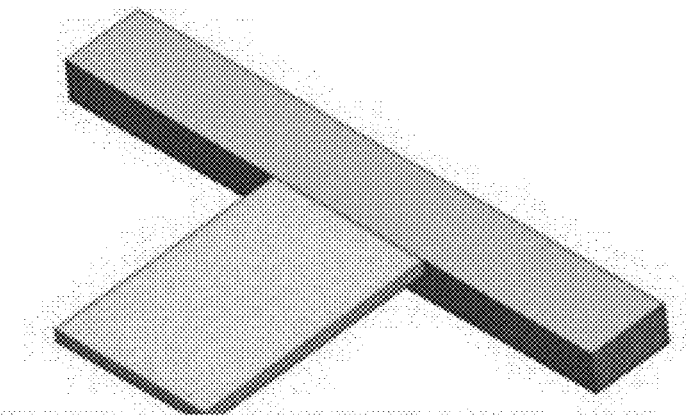
(b) Use focused ion beam etching technique to directly etch a designed groove, and finish the fabrication of a designed microcantilever
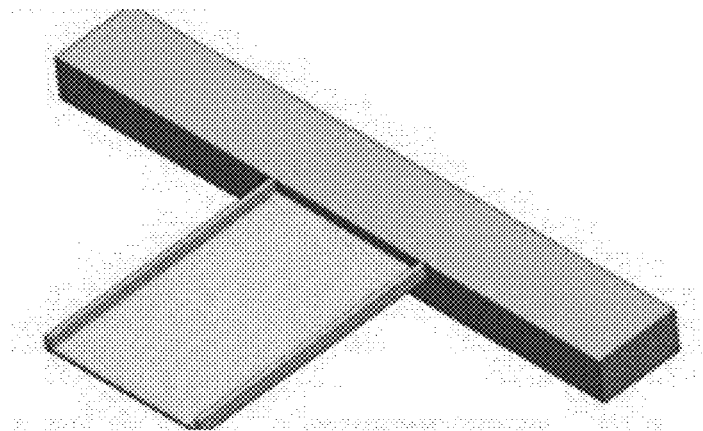
(c) Use appropriate glue to bond the tip to the end of the microcantilever, and finish the fabrication of a designed AFM probe
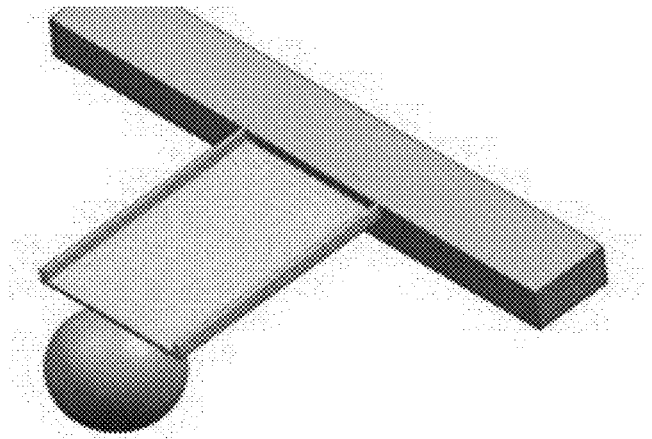
Fig. 7

(a) Original rectangular cross-section microcantilever
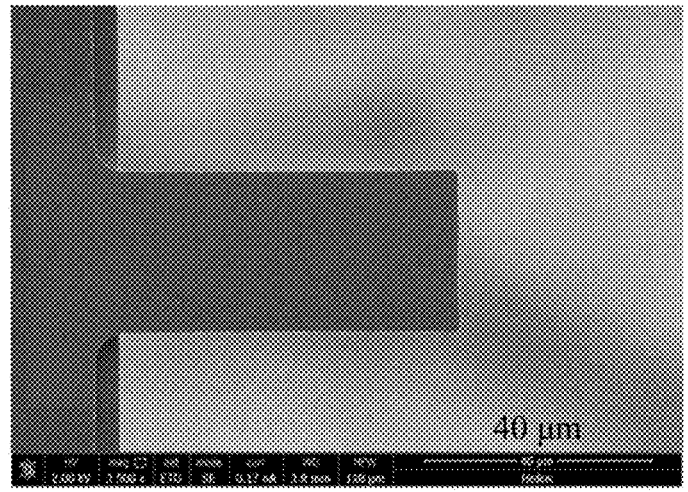
(b) U-shaped cross-section microcantilever fabricated using focused ion beam etching technique
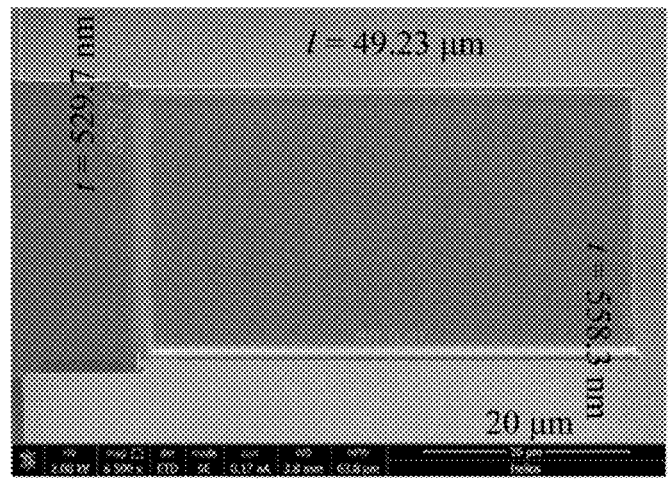
Fig. 8

METHODS FOR DESIGNING AND PROCESSING A MICROCANTILEVER-BASED PROBE WITH AN IRREGULAR CROSS SECTION APPLIED IN AN ULTRA-LOW FRICTION COEFFICIENT MEASUREMENT AT A NANOSCALE SINGLE-POINT CONTACT

CROSS REFERENCE TO RELATED APPLICATIONS

This application is a continuation-in-part application of International Application No. PCT/CN2017/109864, filed on Nov. 8, 2017, which is based upon and claims priority to Chinese Patent Application No. 201711033488.8, filed on Oct. 30, 2017, the entire contents of which are incorporated herein by reference.

TECHNICAL FIELD

The present invention pertains to the technical field of analysis and measurement control in instrumentation technology, and in particular relates to methods for designing and processing a microcantilever-based probe with an irregular cross section applied in an ultra-low friction coefficient measurement at a nanoscale single-point contact.

BACKGROUND

With the worldwide rapid economic growth, losses caused by friction and abrasion in various industries increases accordingly, and the energy crisis gets increasingly severe. According to foreign statistics, 30% of the primary energy around the world is consumed by friction, and about 80% of machine parts get failed due to abrasion. It is roughly estimated that the economic losses caused by friction and abrasion in China exceed a trillion CNY annually. Therefore, the development of a novel anti-friction and lubrication technique becomes a significant research area in energy and resources saving. In recent years, the discovery of superlubricity phenomenon provides a new and important method to solve the problem of energy wastage. It is generally known that a superlubricity state refers to a lubricating state when a magnitude of the coefficient of the sliding friction is equal to or less than 0.001 (referred to as an ultra-low friction coefficient). In the superlubricity state, the friction coefficient is greatly reduced by orders of magnitude, compared to traditional oil lubrication. The superlubricity state has an extra-low abrasion rate which is almost close to zero. The realization and wide application of the superlubricity state greatly reduces the wastage of energy and resource, and significantly improves the service quality of major motion components.

In fact, since numerous factors would affect the superlubricity state and these factors are mutually coupled, the further research on the superlubricity theory and technology is greatly restricted. Nanoscale single-point contact (i.e. the size of the contact area is nanoscale) can eliminate various disturbing factors from the outside like multi-point contact at the macro level etc., and facilitate the quantitative analysis of the superlubricity process. However, the measurement of the ultra-low friction coefficient under the nanoscale single-point contact state is an acknowledged technical problem, which is difficult mainly in the following two aspects. First, the nanoscale single-point contact is usually realized by an atomic force microscope, while the atomic force microscope is mainly applied to surface shape scanning, mechanical property testing, etc. The use of the atomic force microscope almost does not focus on the ultra-low friction coefficient measurement. Second, in most conditions, the resolution of the friction coefficient reported in the literatures is in the magnitude of 0.01, which is far from achieving the measurement of friction coefficient with the resolution in the magnitude that is equal to or less than $10^{-6}$ (i.e. the higher resolution $<10^{-6}$). When the friction coefficient is further reduced to the magnitude that is equal to or less than $10^{-6}$, the signal of the friction force is completely covered by the system noise, so the signal of the friction force is unmeasurable.

To this end, it is significant to optimize and improve the existing measurement technique of friction coefficient of nanoscale single-point contact to realize the measurement of ultra-low friction coefficient with the resolution in the magnitude that is equal to or less than $10^{-6}$.

SUMMARY

The objective of the present invention is to provide a method for designing a microcantilever-based probe with an irregular cross section applied in an ultra-low friction coefficient measurement at a nanoscale single-point contact in consideration of the problems of the prior art stated above. The probe designed by the method can realize the ultra-low friction coefficient measurement with the resolution in the magnitude that is equal to or less than $10^{-6}$. By methods such as the theoretical calculation, the finite element simulation, the microscopic friction experiment etc., it is proved that the probe designed by the method proposed by the present invention can significantly increase the resolution of the friction coefficient measurement and realize the ultra-low friction coefficient measurement, thereby ensuring the authenticity and reliability of the quantitative analysis in the superlubricity process, and providing an important measuring means for a further and systematic research on superlubricity theory and technology.

Based on the above-mentioned method for designing the microcantilever-based probe with an irregular cross section, the present invention further provides a processing method based on the dimensions of the microcantilever-based probe with an irregular cross section obtained by designing.

In the present invention, based on the measurement principle of the atomic force microscope, the friction force and the positive pressure are respectively measured by the torsion and bending of the microcantilever-based probe to establish a universal theoretical model of the friction coefficient measurement. Then, combined with the structural features of the microcantilever-based probe with the irregular cross section, a theoretical model of friction coefficient measurement suitable for a microcantilever-based probe with an irregular cross section is established. On this basis, combined with constraint conditions such as the resolution of the friction coefficient, the loadable maximum positive pressure or the measurable minimum friction force, the atomic force microscope characteristics, and the processability of the probe, the microcantilever-based probe with an irregular cross section is calculated and designed to meet the measurement requirements according to the theoretical model, and the microcantilever-based probe with an irregular cross section is checked and verified by the finite element simulation. The present invention further proposes an implementation method for processing a microcantilever-based probe with an irregular cross section having a designed dimension by using methods such as focused ion beam milling/deposition, focused ion beam etching etc., to obtain a probe applied in the ultra-low coefficient friction measurement at the nanoscale single-point contact in superlubricity state of a sample.

In order to achieve the above-mentioned objectives, the present invention is implemented by the following technical solutions.

The present invention provides a method for designing a microcantilever-based probe with an irregular cross section applied in the ultra-low friction coefficient measurement at the nanoscale single-point contact, wherein an axis of the microcantilever-based probe with the irregular cross section of the probe is a straight line and a uniform cross section is provided along a direction of the axis; to facilitate a reflection of laser and improve the processability of the probe, the cross section is an irregular cross section composed of a plurality of elongate rectangles having an equal wall thickness; the method for designing the probe includes the following steps:

step (1): establishing a universal theoretical model of a friction coefficient measurement using the microcantilever-based probe; wherein a friction force and a positive pressure are respectively measured by a torsion and a bending of the microcantilever-based probe according to a measurement principle of an atomic force microscope, namely, $$F_L = K_T \times \text{invOLS}_L \times U_L \quad (1)$$

$$F_N = K_N \times \text{InvOLS}_N \times U_N \quad (2)$$

wherein, $F_L$ and $F_N$ refer to the friction force and the positive pressure, respectively; $K_T$ and $K_N$ refer to a torsional elastic coefficient and a normal elastic coefficient of the microcantilever-based probe, respectively; $\text{InvOLS}_L$ and $\text{InvOLS}_N$ refer to a reciprocal of a lateral optical lever sensitivity and a reciprocal of a normal optical lever sensitivity, respectively; $U_L$ and $U_N$ refer to a lateral output voltage and a normal output voltage of a photodetector; and the universal theoretical model of the friction coefficient measurement using the microcantilever-based probe is then established, as shown in the following equation:

$$\mu = \frac{F_L}{F_N} = \frac{K_T \times InvOLS_L \times U_L}{K_N \times InvOLS_N \times U_N} \quad (3)$$

wherein μ is the friction coefficient;

step (2): establishing a specific theoretical model for the friction coefficient measurement using the microcantilever-based probe with the irregular cross section, wherein according to a measurement principle of an optical path system, the reciprocal of the lateral optical lever sensitivity $\text{InvOLS}_L$ and the reciprocal of the normal optical lever sensitivity $\text{InvOLS}_N$ are expressed as follows:

$$InvOLS_L = \frac{H/\alpha_L}{4dU_{sum}/\alpha_{sum}} \quad (4)$$

$$InvOLS_N = \frac{Hl/\alpha_N}{6dU_{sum}/\alpha_{sum}} \quad (5)$$

wherein H is a length of a photosensitive surface of the photodetector; d is a length of an optical path; l is a length of a micro-cantilever; $U_{sum}$ is a total voltage generated by the laser in four quadrants of the photodetector; and $\alpha_{sum}$, $\alpha_L$, and $\alpha_N$ respectively refer to magnification times of a total output current, a lateral output current and a normal output current of the photodetector subjected to a current/voltage converter, with a unit of V/A;

based on elastic mechanics and material mechanics theory of thin plates, a torsional elastic coefficient $K_T$ of the microcantilever-based probe with the irregular cross section is expressed as follows:

$$K_T = \frac{F_L}{\varphi_{tip}} = \frac{G \times I_t}{(h_{tip} + e_1) \times l} \quad (6)$$

wherein $\varphi_{tip}$ is a torsion angle of the microcantilever-based probe with the irregular cross section under an action of a friction force $F_L$; G is a shear modulus of a micro-cantilever material; $I_t$ is a torsional inertia moment of the irregular cross section, $h_{tip}$ is a tip height, $e_1$ is a distance from a centroid of the irregular cross section to a bottom side;

the normal elastic coefficient $K_N$ of the microcantilever-based probe with the irregular cross section is expressed as follows:

$$K_N = \frac{F_N}{\upsilon_{tip}} = \frac{3E \times I_{x_C}}{l^3} \quad (7)$$

wherein $\upsilon_{tip}$ is a deflection of the microcantilever-based probe with the irregular cross section under the positive pressure $F_N$; E is an elastic modulus of the micro-cantilever material; since the micro-cantilever material may be anisotropic (such as silicon), a conventional formula $G=E/2(1+\nu)$ (ν is Poisson's ratio) is not always true; $I_{x_C}$ is an inertia moment of the irregular cross section to a neutral axis $x_C$ (an intersection line of a neutral layer and the cross section which passes through the centroid of the cross section);

putting equations (4)-(7) into the universal theoretical model (3) established in step (1) to calculate and obtain the specific theoretical model of the friction coefficient measurement using the microcantilever-based probe with the irregular cross section, as shown in the following equation:

$$\mu = \frac{G \times l}{2E \times (h_{tip} + e_1)} \times \frac{I_t}{I_{x_C}} \times \frac{I_L}{I_N} \quad (8)$$

wherein $I_L$ is the lateral output current of the photodetector, and $I_L=U_L/\alpha_L$; $I_N$ is the normal output current of the photodetector, and $I_N=U_N/\alpha_N$;

step (3): designing the microcantilever-based probe with the irregular cross section meeting requirements for the ultra-low friction coefficient measurement, wherein according to step (2), assuming that μ is a friction coefficient resolution $\mu_{min}$, and $F_N$ is a loadable maximum positive pressure $F_{Nmax}$, or $F_L$ is a measurable minimum friction force $F_{Lmin}$; combined with constraint conditions such as the friction coefficient resolution $\mu_{min}$, the loadable maximum positive pressure $F_{Nmax}$ or the measurable minimum friction force $F_{Lmin}$, and the atomic force microscope characteristics etc., dimensions of the microcantilever-based probe with the irregular cross section are calculated and designed to meet measurement requirements considering equations (1)-(8), the dimensions include a length l, a width $w_i$ of an i-th sub-rectangle constituting the irregular cross section, and a wall thickness t, etc.

The above-mentioned method for designing the microcantilever-based probe with the irregular cross section applied in the ultra-low friction coefficient measurement at the nanoscale single-point contact, wherein the micro-cantilever with the irregular cross section mainly includes two parts, i.e. a first beam for reflecting laser and a second beam fixedly connected to the first beam for supporting and fixing.

The above-mentioned method for designing the microcantilever-based probe with the irregular cross section applied in the ultra-low friction coefficient measurement at the nanoscale single-point contact, wherein a shape of the irregular cross section includes, but is not limited to, a hollow rectangular shape, an I shape, an H shape, an inverted T shape, and a U shape. It is easy to see that the above-mentioned irregular cross section includes a horizontal side constituting the first beam and a vertical side constituting the second beam. At least one horizontal side and at least one vertical side are provided. The horizontal side and the vertical side are mainly the elongate rectangles with an equal wall thickness.

In the above-mentioned method for designing the microcantilever-based probe with the irregular cross section applied in the ultra-low friction coefficient measurement at the nanoscale single-point contact, in the step (2), when $h_{tip}$ is ten times greater than $e_1$, the specific theoretical model is simplified as follows:

$$\mu = \frac{G \times l}{2E \times h_{tip}} \times \frac{I_t}{I_{x_C}} \times \frac{I_L}{I_N}. \qquad (9)$$

In the above-mentioned method for designing the microcantilever-based probe with the irregular cross section applied in the ultra-low friction coefficient measurement at the nanoscale single-point contact, the step (3) mainly includes the following sub-steps:

a) according to a given friction coefficient resolution $\mu_{min}$, since $h_{tip}$ is usually much greater than $e_1$, calculating a quantitative relationship 1 of the length l of the micro-cantilever with the irregular cross section, the torsional inertia moment $I_t$, and an inertia moment $I_{x_C}$ to the neutral axis $x_C$ according to equation (8) or (9), wherein $h_{tip}$ is related to a purpose of microscopic friction experiments; at the beginning of designing, a height and a material of a tip are determined according to a design requirement for a counter pair; G and E are related to a selected material of the micro-cantilever with the irregular cross section, wherein a conventional material of the micro-cantilever with the irregular cross section is silicon or silicon nitride; the G of the silicon is 50 GPa, the E of the silicon is 169 GPa, the G of the silicon nitride is 61 GPa, and the E of the silicon nitride is 156 GPa, it is easy to see that the G and E of silicon and silicon nitride are basically equal; when the material is determined, G and E can be determined; $I_L$ and $I_N$ are related to a selected atomic force microscope photodetector; when the atomic force microscope is determined, a minimum value of $I_L$ and a maximum value of $I_N$ can be determined;

b) calculating a quantitative relationship 2 of the length l of the micro-cantilever with the irregular cross section, the torsional inertia moment $I_t$, or/and the inertia moment $I_{x_C}$ of the neutral axis $x_C$ according to a given loadable maximum positive pressure $F_{Nmax}$ or the measurable minimum friction force $F_{Lmin}$ and the equations (1)-(7);

c) according to structural parameters of the micro-cantilever with the irregular cross section, obtaining a relationship between the torsional inertia moment $I_t$, the inertia moment $I_{x_C}$ of the neutral axis $x_C$ and the width $w_i$ of the i-th sub-rectangle constituting the irregular cross section, the wall thickness t; putting the relationship into the quantitative relationship 1 and the quantitative relationship 2 of l, $I_t$, $I_{x_C}$ obtained in the step a) and the step b) respectively to obtain a quantitative relationship 1' and a quantitative relationship 2' of l, $w_i$, t; further, the width $w_i$ of the i-th sub-rectangle includes a width $w_R$ of the first beam for reflecting the laser (i.e., a width of the horizontal side of the irregular cross section) and a width $w_H$ of the second beam for supporting and fixing (i.e., a width of the vertical side of the irregular cross section);

d) obtaining value ranges of the length l of the micro-cantilever with the irregular cross section, the width $w_i$ of the i-th sub-rectangle and the wall thickness t according to the constraint conditions like the atomic force microscope characteristics, wherein the constraint conditions of the atomic force microscope characteristics include: set value ranges of the width w and the length l of the micro-cantilever with the irregular cross section, which makes laser spots entirely fall within a reflecting surface, and a value range of the wall thickness t of the micro-cantilever with the irregular cross section set according to the material of the micro-cantilever with the irregular cross section etc.; for a conventional commercial atomic force microscope (such as the MFP-3D produced by Oxford Instruments, USA), the constraint conditions include follows: 1) a size of the laser spot is micron-scale, wherein in order to make the laser spots entirely fall within the reflecting surface, the width $w_R$ of the beam for reflecting the laser should be not less than 20 μm and the length l should be not less than 50 μm; 2) an initial wall thickness of a silicon micro-cantilever usually ranges 1 μm-7.8 μm, and an initial wall thickness of a silicon nitride micro-cantilever usually ranges 0.2 μm-0.6 μm, if a requirement for the initial wall thickness exceeds the above-mentioned ranges, it is difficult to process and mold, or material properties after molding or processing cannot meet the requirements of use due to defects such as residual stress and micro-cracks etc.;

as described later, the present invention proposes to process the micro-cantilever with the irregular cross section having designed dimensions by using a focused ion beam technique, which includes but is not limited to focused ion beam milling/deposition and focused ion beam etching etc.;

e) setting at least two parameters of the length l of the micro-cantilever with the irregular cross section, the width $w_i$ of the i-th sub-rectangle and the wall thickness t, according to the value ranges of the length l of the micro-cantilever with the irregular cross section, the width $w_i$ of the i-th sub-rectangle and the wall thickness t; and calculating the remaining unknown parameter of the length l of the micro-cantilever with the irregular cross section, the width $w_i$ of the i-th sub-rectangle, and the wall thickness t according to the quantitative relationship 1' and/or the quantitative relationship 2' to obtain the designed dimensions of the microcantilever-based probe with the irregular cross section.

In the above-mentioned method for designing the micro-cantilever-based probe with the irregular cross section applied in the ultra-low friction coefficient measurement at the nanoscale single-point contact, in order to verify that the microcantilever-based probe with the irregular cross section designed in the step (3) can meet the requirements for measuring the ultra-low friction coefficient, in the step (3), the obtained designed dimensions of the microcantilever-based probe with the irregular cross section are further put in the finite element simulation model to determine whether the key indexes of the friction coefficient measurement, such as the friction coefficient resolution, the loadable maximum positive pressure or the measurable minimum friction force, maximum stress, resonance frequency, etc., meet the set requirements or not; if the key indexes meet the set requirements, the designed dimensions of the microcantilever-based probe with the irregular cross section are determined; if not, the material of the micro-cantilever with the irregular cross section or/and a reflective surface coating are changed, and then the go back to step (3); or the atomic force microscope is changed to make that proper optical path system, photodetector and associated current/voltage converter are configured, and then go back to step (3), until the key indexes of the friction coefficient measurement, such as the friction coefficient resolution, the loadable maximum positive pressure or the measurable minimum friction force, the maximum stress, and the resonance frequency, etc., obtained from the simulation meet the set requirements.

The present invention further provides a method for processing a microcantilever-based probe with an irregular cross section applied in the ultra-low friction coefficient measurement at the nanoscale single-point contact. The processing is performed according to the designed dimensions of the microcantilever-based probe with the irregular cross section obtained in the foregoing to obtain the microcantilever-based probe with the irregular cross section. A tip is provided at an end of the micro-cantilever.

In the above-mentioned method for processing the microcantilever-based probe with the irregular cross section applied in the ultra-low friction coefficient measurement at the nanoscale single-point contact, in order to adapt to the application environment of the existing atomic force microscope, reduce costs of processing the small-lot customized microcantilever-based probe with the irregular cross section, and improve processing efficiency, the commercial probe having dimensions similar to the designed dimensions of the microcantilever-based probe with the irregular cross section is taken as a processing object, and the microcantilever-based probe with the irregular cross section having the designed dimensions is processed by using the focused ion beam technique which includes, but is not limited to, the focused ion beam milling/deposition, the focused ion beam etching, and so on. In detail, with regard to the focused ion beam milling/deposition, first the first beam for reflecting laser and the second beam for supporting and fixing are processed by focused ion beam milling, then the second beam for supporting and fixing obtained from the milling is attached to the first beam for reflecting laser by focused ion beam deposition, and finally the tip is bonded to the end of the micro-cantilever after processing to complete the probe. With regard to the focused ion beam etching, the micro-cantilever with the irregular cross section having designed dimensions is directly etched and processed by the focused ion beam, and finally the tip is bonded to the end of the micro-cantilever after processing to complete the probe.

In the above-mentioned method for processing the microcantilever-based probe with the irregular cross section applied in the ultra-low friction coefficient measurement at the nanoscale single-point contact, according to experimental requirements, a material of the tip is at least one selected from silicon, silicon nitride, silicon dioxide, diamond, diamond-like material, aluminum oxide, zirconium dioxide, titanium dioxide, cerium oxide, graphite, gold and graphene, molybdenum disulfide, and hexagonal boron nitride.

The microcantilever-based probe with the irregular cross section fabricated according to the design and processing method proposed by the present invention is applied in the ultra-low friction coefficient measurement at the nanoscale single-point contact under the superlubricity state of the sample.

Compared with the design and processing methods of the microcantilever-based probe in the prior art, the method proposed by the present invention has the following advantages.

1. The specific theoretical model of the friction coefficient measurement using the microcantilever-based probe with the irregular cross section established in the present invention proves that the friction coefficient resolution is directly proportional to the length l of the micro-cantilever and the ratio $I_t/I_{xC}$ of the torsional inertia moment $I_t$ of the irregular cross section and the inertia moment $I_{xC}$ of the irregular cross section to the neutral axis $x_C$, thereby providing methods for designing and processing the microcantilever-based probe with the irregular cross section having higher friction coefficient resolution. By the method, a probe applied in the ultra-low friction coefficient measurement using nanoscale single-point contact can be fabricated.

2. The probe designed and processed based on the method proposed by the present invention can greatly improve the measurement resolution of the friction coefficient, realize the ultra-low friction coefficient measurement with the resolution in the magnitude that is equal to or less than $10^{-6}$, ensure the authenticity and reliability of the quantitative analysis in the superlubricity process, and provide an important measurement method for further systematic research on the superlubricity theory and technology.

3. Based on the specific theoretical model of the friction coefficient measurement using the microcantilever-based probe with the irregular cross section established by the present invention, the friction coefficient resolution can not only be improved by optimizing the structure of the microcantilever-based probe, but also can be improved by other means, for example by optimizing and improving the optical path system. Meanwhile, the specific theoretical model can also be applied to other researches related to the tribology and has a high practical value.

BRIEF DESCRIPTION OF THE DRAWINGS

In order to clarify the embodiments of the present invention or the technical solutions in the prior art, the drawings required in the description of the embodiments or the prior art will be briefly described hereinafter. Obviously, the drawings described below merely show a part of the embodiments of the present invention. Those of ordinary skill in the art can derive other embodiments and drawings thereof according to the embodiments shown in these drawings without creative efforts.

FIG. 3 is a schematic diagram showing the structural parameters of a cross section with a hollow rectangular shape (a), an I shape (b), an H shape (c), an inverted T shape (d), and a U shape (e) provided by the embodiment, wherein 1 is a horizontal side and 2 is a vertical side.

FIG. 4 shows a finite element simulation result of a microcantilever-based probe with a U-shaped cross section provided by an embodiment, wherein (a) is a stress distribution diagram at a cross section with the maximum stress when 25 μN positive pressure is loaded (the safety factor is 10); (b) is a finite element simulation result of the normal elastic coefficient when 0-5 μN positive pressure is loaded; (c) is a finite element simulation results of the torsional elastic coefficient when 2.5 μN positive pressure and 0-0.25 μN friction force are loaded.

FIG. 5 shows a finite element simulation result of a microcantilever-based probe with a U-shaped cross section provided by an embodiment, wherein (a) is a stress distribution diagram at a cross section with the maximum stress when 250 μN positive pressure is loaded (the safety factor is 10); (b) is a finite element simulation result of the normal elastic coefficient when 0-50 μN positive pressure is loaded; (c) is a finite element simulation results of the torsional elastic coefficient when 25 μN positive pressure and 0-0.25 μN friction force are loaded.

FIG. 6 is a schematic diagram showing a focused ion beam milling/deposition process of a microcantilever-based probe with a U-shaped cross section provided by the embodiment, wherein (a) shows a processing of a second beam for supporting and fixing; (b) shows that deposition the beam after milling is attached on the first beam for reflecting the laser; (c) shows a schematic diagram after the tip is bonded.

FIG. 7 is a schematic diagram showing a focused ion beam etching process of a microcantilever-based probe with a U-shaped cross section provided by the embodiment, wherein (a) shows an original cantilever; (b) shows a U-shaped cantilever obtained by etching; (c) shows a schematic diagram after the tip is bonded.

FIG. 8 shows a comparison between the original cantilever (a) and the micro-cantilever (b) with a U-shaped cross section obtained by focused ion beam etching provided by the embodiment.

DETAILED DESCRIPTION OF THE EMBODIMENTS

Figure 1:
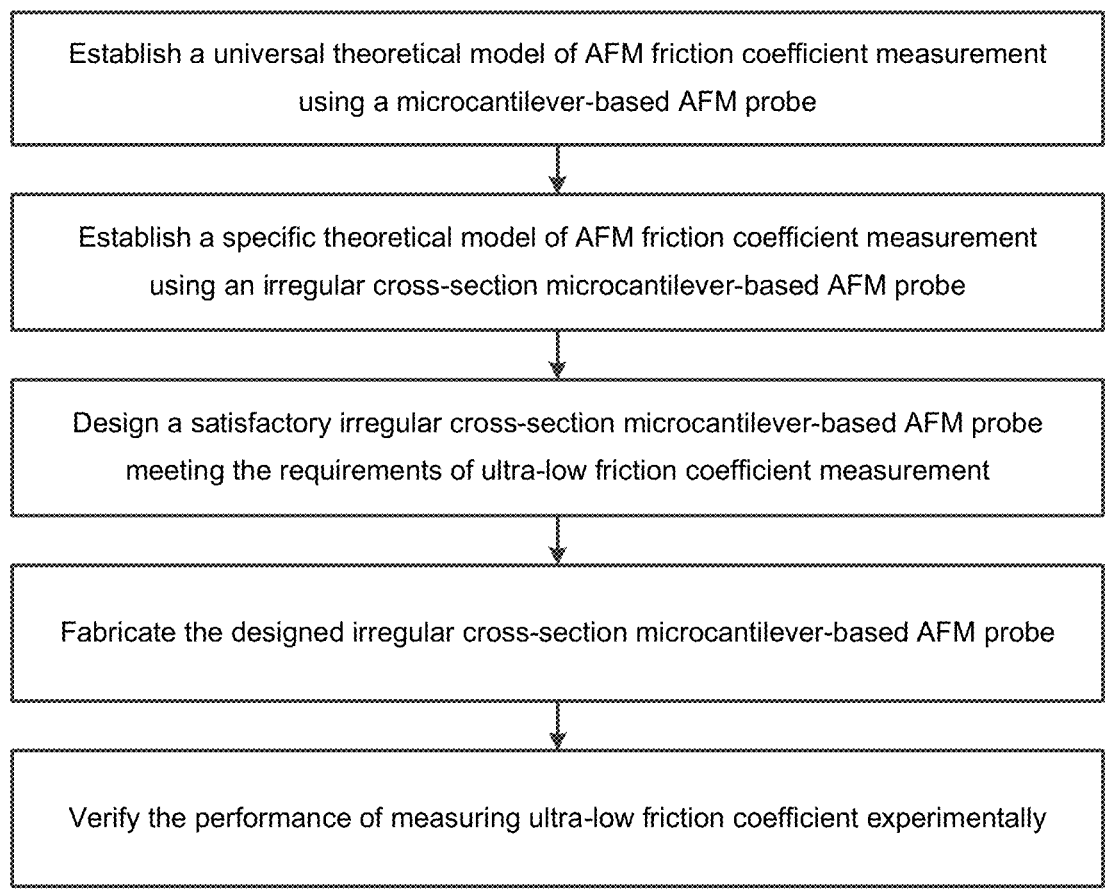
FIG. 1 is a flow chart showing a method for designing a microcantilever-based probe with an irregular cross section applied in an ultra-low friction coefficient measurement at a nanoscale single-point contact provided by an embodiment.

The technical solutions of the various embodiments of the present invention are clearly and completely described hereinafter with reference to the drawings. Obviously, the described embodiments are merely a part of the embodiments of the present invention instead of all. Any other embodiment obtained by those of ordinary skill in the art based on the embodiments of the present invention without creative efforts should be considered as falling within the scope of the present invention.

Embodiment 1

According to a microcantilever-based probe with the irregular cross section designed in the present embodiment, the micro-cantilever with the irregular cross section mainly includes two parts, namely, a first beam for reflecting laser and a second beam fixedly connected to the first beam for supporting and fixing. The axis line of the micro-cantilever with the irregular cross section is a straight line. A uniform cross section is provided along the direction of the axis line. In order to facilitate the laser reflection and improve the processability of the probe, the cross section is an irregular cross section composed of a plurality of elongate rectangles having an equal wall thickness. In the present embodiment, the cross sections with five shapes are taken as the design basis, and the five shapes include a hollow rectangular shape, an I shape, an H shape, an inverted T shape, and a U shape. The method for designing the microcantilever-based probe with the irregular cross section is specifically described. However, the above-mentioned five shapes are not intended to limit the microcantilever-based probe with the irregular cross section of the present invention in any aspect. It is easy to see that these irregular cross sections each include a horizontal side 1 constituting the first beam and a vertical side 2 constituting the second beam. At least one horizontal side and at least one vertical side are provided. The horizontal side and the vertical side are elongate rectangles with an equal thickness, and have a width of $w_i$ (i=R,H) and a wall thickness of t.

In the present embodiment, the microcantilever-based probe with the irregular cross section is designed based on the following requirements of the ultra-low friction coefficient measurement: 1) the ultra-low friction coefficient measurement with the resolution in the magnitude that is equal to or less than $10^{-6}$ should be realized; 2) the loadable maximum positive pressure is equal to or around 2.5 μN; 3) the material of the micro-cantilever is silicon nitride; 4) the tip has a height of 23 μm, and the material of the tip is graphene-coated silica microsphere; 5) the experimental platform is MFP-3D atomic force microscope.

The characteristics of the MFP-3D atomic force microscope in the present embodiment are listed below. 1) The size of the laser spot is micron-scaled, and in order to make the laser spots totally fall within the reflective surface, the width $w_R$ (i.e., the width of the horizontal side of the irregular cross section) of the first beam for reflecting the laser that constitutes the micro-cantilever of the to-be-designed probe should be not less than 20 μm, and the length l of the micro-cantilever of the to-be-designed probe should be not less than 50 μm. 2) The wall thickness t (i.e., the wall thickness of the horizontal side and the vertical side of the irregular cross section) of the silicon nitride micro-cantilever usually ranges 0.2 μm-0.6 μm. 3) After measuring, the fitting relationship of the reciprocal of the normal optical lever sensitivity $InvOLS_N$ in the optical path system and the length l of the micro-cantilever, the total voltage $U_{sum}$ generated by the laser in the four quadrants of the photodetector is $InvOLS_N(nm/V)=0.00274\times l/U_{sum}+24.7$, and the fitting relationship of the reciprocal of the lateral optical lever sensitivity $InvOLS_L$ and $U_{sum}$ is $InvOLS_L(rad/V)=0.0697/U_{sum}+0.00879$ (4.5 V<$U_{sum}$<5.8 V). 4) The voltage resolution $U_{Lmin}$ of the photodetector is 0.01 mV (besides, the reference J. Li, C. Zhang, P Cheng, X Chen, W Wang and J. Luo, Langmuir, 32, 5593 (2016) shows that $U_{Lmin}$ of MFP-3D atomic force microscopy is 0.002 mV, which is not adopted by the present invention), and the maximum value $U_{Nmax}$ of the voltage measurement range is 20 V. 5) the ratio $I_{Lmin}/I_{Nmax}$ of the current resolution $I_{Lmin}$ and the current measurement range $I_{Nmax}$ of the photodetector is $7\times10^{-6}$.

As shown in FIG. 1, the present embodiment provides a method for designing a microcantilever-based probe with the irregular cross section applied in the ultra-low friction coefficient measurement at the nanoscale single-point contact, which includes the following steps.

Step (1): a universal theoretical model of a friction coefficient measurement using the microcantilever-based probe is established.

Figure 2:
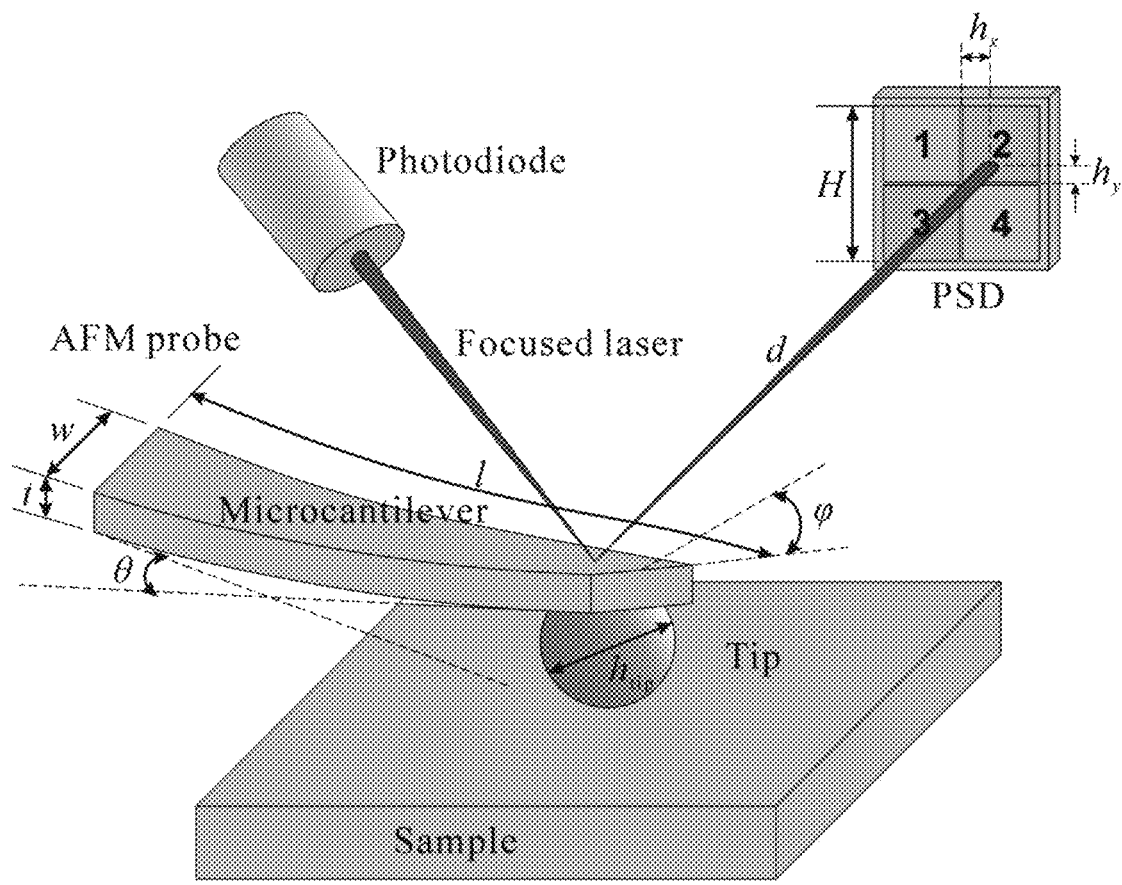
FIG. 2 is a schematic diagram showing the friction coefficient measurement using the microcantilever-based probe provided by the embodiment.

The friction force and positive pressure are respectively measured by a torsion and a bending of the microcantilever-based probe according to a measurement principle of an atomic force microscope, as shown in FIG. 2, namely, $$F_L = K_T \times \text{InvOLS}_L \times U_L \quad (1)$$

$$F_N = K_N \times \text{InvOLS}_N \times U_N \quad (2)$$

where $F_L$ and $F_N$ refer to friction force and positive pressure, respectively; $K_T$ and $K_N$ refer to a torsional elastic coefficient and a normal elastic coefficient of the microcantilever-based probe, respectively; $\text{InvOLS}_L$ and $\text{InvOLS}_N$ refer to a reciprocal of a lateral optical lever sensitivity and a reciprocal of a normal optical lever sensitivity, respectively; $U_L$ and $U_N$ refer to a lateral output voltage and a normal output voltage of a photodetector, respectively.

After that, the universal theoretical model of the friction coefficient measurement using the microcantilever-based probe is established, as shown in the following equation:

$$\mu = \frac{F_L}{F_N} = \frac{K_T \times InvOLS_L \times U_L}{K_N \times InvOLS_N \times U_N} \quad (3)$$

where $\mu$ is the friction coefficient.

Step (2): A specific theoretical model of the friction coefficient measurement using the microcantilever-based probe with the irregular cross section is established.

According to a measurement principle of an optical path system, the reciprocal of the lateral optical lever sensitivity $\text{InvOLS}_L$ and the reciprocal of the normal optical lever sensitivity $\text{InvOLS}_N$ are expressed as follows:

$$InvOLS_L = \frac{H/\alpha_L}{4dU_{sum}/\alpha_{sum}} \quad (4)$$

$$InvOLS_N = \frac{Hl/\alpha_N}{6dU_{sum}/\alpha_{sum}} \quad (5)$$

where H is a length of a photosensitive surface of the photodetector; d is a length of an optical path; l is a length of a micro-cantilever; $U_{sum}$ is a total voltage generated by the laser in four quadrants of the photodetector; and $\alpha_{sum}$, $\alpha_L$, and $\alpha_N$ refer to magnification times of a total output current, a lateral output current and a normal output current of the photodetector after subjected to a current/voltage converter, with a unit of V/A.

Based on elastic mechanics and material mechanics theory of thin plates, the torsional elastic coefficient $K_T$ of the microcantilever-based probe with the irregular cross section is expressed as follows:

$$K_T = \frac{F_L}{\varphi_{tip}} = \frac{G \times I_t}{(h_{tip} + e_1) \times l} \quad (6)$$

where $\varphi_{tip}$ is a torsion angle of the microcantilever-based probe with the irregular cross section under an action of friction force $F_L$; G is a shear modulus of the micro-cantilever material; $I_t$ is a torsional inertia moment of the irregular cross section, $h_{tip}$ is a tip height, $e_1$ is a distance from a centroid of the irregular cross section to a bottom side.

The normal elastic coefficient $K_N$ of the microcantilever-based probe with the irregular cross section is expressed as follows:

$$K_N = \frac{F_N}{v_{tip}} = \frac{3E \times I_{x_C}}{l^3} \quad (7)$$

where $v_{tip}$ is a deflection of the microcantilever-based probe with the irregular cross section under the action of the positive pressure $F_N$; E is an elastic modulus of the microcantilever material; since the micro-cantilever material may be anisotropic (such as silicon), a conventional formula $G=E/2(1+v)$ (v is Poisson's ratio) is not always true; $I_{x_C}$ is an inertia moment of the irregular cross section to a neutral axis $x_C$ (an intersection line of a neutral layer and the cross section, which passes through the centroid of the cross section).

The equations (4)-(7) are put into the universal theoretical model (3) established in step (1) to calculate and obtain the specific theoretical model of the friction coefficient measurement using the microcantilever-based probe with the irregular cross section, as shown in the following equation:

$$\mu = \frac{G \times l}{2E \times (h_{tip} + e_1)} \times \frac{I_t}{I_{x_C}} \times \frac{I_L}{I_N} \quad (8)$$

where $I_L$ is a lateral output current of the photodetector, and $I_L = U_L/\alpha_L$; $I_N$ is a normal output current of the photodetector, and $I_N = U_N/\alpha_N$.

In the present embodiment, when $h_{tip}$ is ten times greater than $e_1$, the specific theoretical model is simplified as follows:

$$\mu = \frac{G \times l}{2E \times h_{tip}} \times \frac{I_t}{I_{x_C}} \times \frac{I_L}{I_N}. \quad (9)$$

Step (3): the microcantilever-based probe with the irregular cross section meeting the requirements for the ultra-low friction coefficient measurement is designed.

According to step (2), assuming that $\mu$ a friction coefficient resolution $\mu_{min}$, and $F_N$ is a loadable maximum positive pressure $F_{Nmax}$, or $F_L$ is a measurable minimum friction force $F_{Lmin}$, combined with constraint conditions such as the friction coefficient resolution $\mu_{min}$, the loadable maximum positive pressure $F_{Nmax}$ or the measurable minimum friction force $F_{Lmin}$, and the atomic force microscope characteristics etc., the equations (1)-(9) are considered with structural features of the irregular cross section to calculate and design the dimensions of the microcantilever-based probe with the irregular cross section that meets the measurement requirements. The dimensions include a length l, a width $w_i$ of an i-th sub-rectangle, a wall thickness t, etc. Also, a finite element simulation is used for check and verification.

In the present embodiment, the specific processes of designing the microcantilever-based probe with the irregular cross section that meet the requirements for the ultra-low friction coefficient measurement at the nanoscale single-point contact are as follows.

a) The friction coefficient resolution $\mu_{min} \leqslant 10^{-6}$ is set in the present embodiment, that is, $$\mu_{min} = \left(\frac{F_L}{F_N}\right)_{min} = \quad (10)$$

$$\left(\frac{G \times l}{2E \times h_{tip}} \times \frac{I_t}{I_{x_C}} \times \frac{I_L}{I_N}\right)_{min} = \frac{G \times l}{2E \times h_{tip}} \times \frac{I_t}{I_{x_C}} \times \frac{I_{Lmin}}{I_{N\,max}} \leq 10^{-6}$$

where $I_{Lmin}$ and $I_{Nmax}$ refer to the current resolution and the current measurement range of the photodetector, respectively; G of silicon nitride is 61 GPa; E of silicon nitride is 156 GPa; a tip height $h_{tip}$ is 23 μm, and $I_{Lmin}/I_{Nmax}$ is $7\times10^{-6}$. The above parameters are put into the equation (10) to calculate the quantitative relationship 1 of l, $I_t$ and $I_{xC}$, that is $$l \times \frac{I_t}{I_{xC}} \leq 16.8 \quad (11)$$

where the unit of length is μm.

b) The loadable maximum positive pressure $F_{Nmax}$ is set to be equal to or around 2.5 μN in the present embodiment, that is $$F_{Nmax}=(K_N \times \text{InvOLS}_N \times U_N)_{max}=K_N \times \text{InvOLS}_N \times U_{Nmax} \approx 2.5 \quad (12)$$

where $U_{Nmax}$ is the voltage measurement range of the photodetector. As previously mentioned, in the present embodiment, the voltage measurement range $U_{Nmax}$ of the photodetector of the MFP-3D atomic force microscope is 20 V; the fitting relationship of the reciprocal of the normal optical lever sensitivity $\text{InvOLS}_N$ and the length l of the micro cantilever, the total voltage $U_{sum}$ generated by the laser in the four quadrants of the photodetector is expressed as follows:

$$\text{InvOLS}_N \text{ (nm/V)}=0.00274\times l/U_{sum}+24.7 \quad (13).$$

In the present embodiment, the reflective surface coating of the micro-cantilever with the irregular cross section is made of gold, and the total voltage $U_{sum}$ generated by the laser reflected to the four quadrants of the photodetector by the gold coating is about 5 V, so putting $U_{sum}=5V$ into equation (13) to calculate and obtain the following equation:

$$\text{InvOLS}_N \text{ (nm/V)}=0.000548\times l+24.7 \quad (14)$$

The equations (7) and (14) are put into the equation (12) to calculate and obtain the quantitative relationship 2 between l and $I_{xC}$, that is, $$\frac{0.000548 \times l + 0.0247}{l^3} \times I_{xC} \approx 2.67 \times 10^{-7} \quad (15)$$

where the unit of length is μm.

c) $I_t$ is the torsional inertia moment of the irregular cross section, and is related to the structural parameters of the cross section including the width $w_R$ of the first beam for reflecting the laser (i.e., the width of the horizontal side of the irregular cross section), the width $w_H$ of the second beam for supporting and fixing (i.e., the width of the vertical side of the irregular cross section), and the wall thickness t. $I_{xC}$ is the inertia moment of the irregular cross section to the neutral axis $x_C$, and is related to the structural parameters of the cross section including $w_R$, $w_H$ and t. According to the structural parameters of the irregular cross section, the relationships between $I_t$, $I_{xC}$ and $w_R$, $w_H$ and t are obtained, respectively.

As shown in FIG. 3, the hollow rectangular shaped cross section consists of two symmetrically disposed horizontal sides and two vertical sides fixedly connected to two ends of the two horizontal sides. The torsional inertia moment $I_t$, the inertia moment $I_{xC}$ to the neutral axis $x_C$, and the distance $e_1$ from the centroid to the bottom side are respectively expressed as follows:

$$I_t = \frac{2(w_R + t)^2 \times (w_H - t)^2 \times t}{w_R + w_H} \quad (16)$$

$$I_{xC} = \frac{(w_R + 2t) \times w_H^3 - w_R \times (w_H - 2t)^3}{12} \quad (17)$$

$$e_1 = \frac{w_H}{2}. \quad (18)$$

As shown in FIG. 3, the I-shaped cross section consists of two symmetrically disposed horizontal sides and one vertical side fixedly connected to the middle portion of the two horizontal sides. The torsional inertia moment $I_t$, the inertia moment $I_{xC}$ to the neutral axis $x_C$, and the distance $e_1$ from the centroid to the bottom side are expressed as follows:

$$I_t = \frac{(2w_R + w_H) \times t^3}{3} \quad (19)$$

$$I_{xC} = \frac{w_R \times (w_H + 2t)^3 - (w_R - t) \times w_H^3}{12} \quad (20)$$

$$e_1 = \frac{w_H}{2} + t. \quad (21)$$

As shown in FIG. 3, the H-shaped cross section consists of two symmetrically disposed vertical sides and one horizontal side fixedly connected to the middle portion of the two vertical sides. The torsional inertia moment $I_t$, the inertia moment $I_{xC}$ to the neutral axis $x_C$, and the distance $e_1$ from the centroid to the bottom side are expressed as follows:

$$I_t = \frac{(w_R + 2w_H) \times t^3}{3} \quad (22)$$

$$I_{xC} = \frac{2t \times w_H^3 + w_R \times t^3}{12} \quad (23)$$

$$e_1 = \frac{t}{2}. \quad (24)$$

As shown in FIG. 3, the inverted T-shaped cross section consists of one horizontal side and one vertical side fixedly connected to the middle portion of the horizontal side, and the vertical side is located above the horizontal side. The torsional inertia moment $I_t$, the inertia moment $I_{xC}$ to the neutral axis $x_C$, and the distance $e_1$ from the centroid to the bottom side are expressed as follows:

$$I_t = \frac{(w_R + w_H) \times t^3}{3} \quad (25)$$

$$I_{xC} = \frac{w_R \times e_1^3 - (w_R - t) \times (e_1 - t)^3 + t \times (w_H + t - e_1)^3}{3} \quad (26)$$

$$e_1 = \frac{t \times (w_H + t)^2 + (w_R - t) \times t^2}{2[t \times (w_H + t) + (w_R - t) \times t]}. \quad (27)$$

As shown in FIG. 3, the U-shaped cross section consists of two symmetrically disposed vertical sides and one horizontal side fixedly connected to the lower ends of the two vertical sides. The torsional inertia moment $I_t$, the inertia moment $I_{xC}$ to the neutral axis $x_C$, and the distance $e_1$ from the centroid to the bottom side are expressed as follows:

$$I_t = \frac{(w_R + 2w_H) \times t^3}{3} \quad (28)$$

$$I_{x_C} = \frac{w_R \times e_1^3 - (w_R - 2t) \times (e_1 - t)^3 + 2t \times (w_H + t - e_1)^3}{3} \quad (29)$$

$$e_1 = \frac{2t \times (w_H + t)^2 + (w_R - 2t) \times t^2}{2[2t \times (w_H + t) + (w_R - 2t) \times t]} \quad (30)$$

The equations (16)-(30) are put into the quantitative relationship 1 (i.e. equation (11)) and the quantitative relationship 2 (i.e. equation (15)) to calculate and obtain the quantitative relationship 1' and the quantitative relationship 2' of the length l of the micro-cantilever with a hollow rectangular shaped cross section, an I-shaped cross section, an H-shaped cross section, an inverted T-shaped cross section, or a U-shaped cross section, the width $w_R$ of the first beam for reflecting the laser, the width $w_H$ of the second beam for supporting and fixing, and the wall thickness t.

d) According to the constraint conditions such as characteristics of the atomic force microscope and the processability of the probe, the value ranges of the length l of the micro-cantilever with the irregular cross section, the width $w_R$ of the first beam for reflecting the laser, and the wall thickness t are determined.

According to the MFP-3D atomic force microscope characteristics described above, the width $w_R$ of the first beam for reflecting the laser (i.e., the width of the horizontal side of the irregular cross section) that constitutes the micro-cantilever of the to-be-designed probe should be not less than 20 μm, the length l of the micro-cantilever of the to-be-designed probe should be not less than 50 μm, and the wall thickness t (i.e., the wall thickness of the horizontal side and the vertical side of the irregular cross section) of the silicon nitride micro-cantilever usually ranges 0.2 μm-0.6 μm.

e) According to the equation (9), it can be deduced that the friction coefficient resolution $\mu_{min}$ of the microcantilever-based probe with the irregular cross section is directly proportional to the length l of the micro-cantilever. In order to as much as possible set aside a margin for designing the dimensions of the cross-section, the length l of the micro-cantilever should be as short as possible. In the present embodiment, combined with the value range of the length l of the micro-cantilever determined in step d), the length l of the micro-cantilever is set as a minimum value of 50 μm. Furthermore, in order to facilitate processing, the width $w_R$ of the first beam for reflecting laser in the present embodiment is consistent with the width of a commercial probe. The commercial silicon nitride probe available now has a width of 35 μm, so that the first beam for reflecting laser is designed to have a width of 35 μm. The set length l of the micro-cantilever and the width $w_R$ of the first beam for reflecting the laser are put into the quantitative relationship 1' and/or the quantitative relationship 2' to calculate and obtain the quantitative relationship between the width $w_H$ of the second beam for support fixation and the wall thickness t. According to the value range of the wall thickness t of the micro-cantilever determined in step d), for the convenience of processing, the wall thickness t is determined to be 0.2 μm. According to the quantitative relationship between $w_H$ and t, a value of the width $w_H$ the second beam for supporting and fixing is calculated and obtained.

Since the design process involves the round-off of the significant figures, a re-substitution and a calculation are performed. The theoretical calculation results of the hollow rectangular cross section, the I-shaped cross section, the H-shaped cross section, the inverted T-shaped cross section and U-shaped cross section are shown in Table 1.

TABLE 1

The theoretical calculation results and the finite element simulation results of the micro-cantilever probe with the irregular cross section (Note: the safety factor is 10 during stress analysis, that is, the loaded positive pressure is 10 times than the set positive pressure $F_{nset}$)

| Cross section | $F_{nset}$ (μN) | Material | Calculation results | l (μm) | $w_R$ (μm) | $w_H$ (μm) | t (μm) | $h_{tip}$ (μm) | $K_N$ (N/m) | $K_T$ (μN/rad) | $\sigma_{max}$ (GPa) | f (kHz) | $F_{nmax}$ (μN) | $F_{Lmin}$ (pN) | $\mu_{min}$ |
|---|---|---|---|---|---|---|---|---|---|---|---|---|---|---|---|
| Hollow reatangular | 2.5 | silicon nitride | theoretical calculation | 50 | 35 | 0.6 | 0.2 | 23 | 2.30 | 117 | x | x | 2.39 | 26.5 | $1 \times 10^{-5}$ |
| | | | finite element simulation | | | | | | 2.22 | 125 | 1.11 | 324 | 2.31 | 28.5 | $1 \times 10^{-5}$ |
| | 25 | | theoretical calculation | | | 1.5 | | | 22.7 | 1179 | x | x | 23.7 | 268 | $1 \times 10^{-5}$ |
| | | | finite element simulation | | | | | | 21.6 | 1183 | 3.35 | 922 | 22.5 | 269 | $1 \times 10^{-5}$ |
| I-shaped | 2.5 | | theoretical calculation | | | 0.2 | | | 2.270 | 9.80 | x | x | 2.37 | 2.23 | $9 \times 10^{-7}$ |
| | | | finite element simulation | | | | | | 2.170 | 9.82 | 1.45 | 319 | 2.26 | 2.23 | $1 \times 10^{-6}$ |
| | 25 | | theoretical calculation | | | 1.2 | | | 26.0 | 9.73 | x | x | 27.1 | 2.21 | $8 \times 10^{-8}$ |
| | | | finite element simulation | | | | | | 23.9 | 9.76 | 4.51 | 1039 | 24.9 | 2.21 | $9 \times 10^{-8}$ |
| H-shaped | 2.5 | | theoretical calculation | | | 2.7 | | | 2.54 | 5.69 | x | x | 2.65 | 1.29 | $5 \times 10^{-7}$ |
| | | | finite element simulation | | | | | | 2.54 | 5.65 | 2.49 | 462 | 2.64 | 1.28 | $5 \times 10^{-7}$ |
| | 25 | | theoretical calculation | | | 5.8 | | | 24.4 | 6.56 | x | x | 25.5 | 1.49 | $6 \times 10^{-8}$ |
| | | | finite element simulation | | | | | | 24.2 | 6.52 | 5.55 | 1324 | 25.3 | 1.48 | $6 \times 10^{-8}$ |
| Inverted T-shaped | 2.5 | | theoretical calculation | | | 2 | | | 2.30 | 5.20 | x | x | 2.40 | 1.18 | $5 \times 10^{-7}$ |
| | | | finite element simulation | | | | | | 2.26 | 5.20 | 4.15 | 452 | 2.36 | 1.18 | $5 \times 10^{-7}$ |

TABLE 1-continued

The theoretical calculation results and the finite element simulation results of the micro-cantilever probe with the irregular cross section
(Note: the safety factor is 10 during stress analysis, that is, the loaded positive pressure is 10 times than the set positive pressure $F_{nset}$)

| Cross section | $F_{nset}$ (μN) | Material | Calculation results | l (μm) | $w_R$ (μm) | $w_H$ (μm) | t (μm) | $h_{tip}$ (μm) | $K_N$ (N/m) | $K_T$ (μN/rad) | $\sigma_{max}$ (GPa) | f (kHz) | $F_{nmax}$ (μN) | $F_{Lmin}$ (pN) | $\mu_{min}$ |
|---|---|---|---|---|---|---|---|---|---|---|---|---|---|---|---|
| U-shaped | 25 | | theoretical calculation | | | | | 4.6 | 23.7 | 5.51 | x | x | 24.7 | 1.25 | $5 \times 10^{-8}$ |
| | | | finite element simulation | | | | | | 22.6 | 5.52 | 8.73 | 1342 | 23.5 | 1.25 | $5 \times 10^{-8}$ |
| | 2.5 | | theoretical calculation | | | | | 1.6 | 2.38 | 5.36 | x | x | 2.48 | 1.22 | $5 \times 10^{-7}$ |
| | | | finite element simulation | | | | | | 2.33 | 5.36 | 3.20 | 450 | 2.42 | 1.22 | $5 \times 10^{-7}$ |
| | 25 | | theoretical calculation | | | | | 3.7 | 23.8 | 5.88 | x | x | 24.8 | 1.34 | $5 \times 10^{-8}$ |
| | | | finite element simulation | | | | | | 22.6 | 5.88 | 6.80 | 1321 | 23.5 | 1.34 | $6 \times 10^{-8}$ |

Furthermore, the obtained designed dimensions of the microcantilever-based probe with the irregular cross section are put into the finite element simulation model, and the finite element software NX Nastran is used to simulate to obtain the friction coefficient resolution, the loadable maximum positive pressure or the measurable minimum friction force, the maximum stress, the resonance frequency, and finite element simulation results, as shown in Table 1 and FIG. 4. It can be seen that the I-shaped cross section, the H-shaped cross section, the inverted T-shaped cross section, and the U-shaped cross section all entirely meet the set requirements, except for the hollow rectangular cross section. For the hollow rectangular cross section, a method of changing the atomic force microscope may be used to ensure proper optical path system, photodetector and the associated current/voltage converter thereof, so that the key indexes of measuring the friction coefficient meet the set requirements. Since the I shaped cross section, H-shaped cross section, inverted T-shaped cross section, and U-shaped cross section in the embodiment all entirely meet the set requirements, the process of optimizing the hollow rectangular cross section does not need to be described in detail.

Embodiment 2

In the present embodiment, the microcantilever-based probe with the irregular cross section is designed based on the following requirements of the ultra-low friction coefficient measurement: 1) the ultra-low friction coefficient measurement with an resolution in the magnitude that is equal to or less than $10^{-6}$ should be realized; 2) the loadable maximum positive pressure is equal to or around 25 μN; 3) the material of the micro-cantilever is silicon nitride; 4) the tip height is 23 μm, and the material of the tip is graphene-coated silica microsphere; 5) the experimental platform is MFP-3D atomic force microscope.

In the present embodiment, the steps of designing the microcantilever-based probe with the irregular cross section are consistent with the steps of Embodiment 1, and the results of theoretical calculations and the finite element simulation are shown in Table 1 and FIG. 5. It can be seen that the I-shaped cross section, the H-shaped cross section, the inverted T-shaped cross section, and the U-shaped cross section all entirely meet the set requirements, except for the hollow rectangular cross section. For the hollow rectangular cross section, a method of changing the atomic force microscope may be used to ensure proper optical path system, photodetector and the associated current/voltage converter thereof, so that the key indexes of measuring the friction coefficient meet the set requirements. Since the I shaped cross section, H-shaped cross section, inverted T-shaped cross section, and U-shaped cross section in the embodiment all entirely meet the set requirements, the process of optimizing the hollow rectangular cross section does not need to be described in detail.

In conclusion, the feasibility and the accuracy of the method for designing the microcantilever-based probe with the irregular cross section are verified by Embodiment 1 and Embodiment 2 in both aspects of theoretical calculation and the finite element simulation.

Embodiment 3

The present embodiment provides a method for processing the microcantilever-based probe with the irregular cross section by the focused ion beam milling/deposition, which meets the requirements for the ultra-low friction coefficient measurement at the nanoscale single-point contact. In consideration of the probe processing convenience, taking a microcantilever-based probe with the U-shaped cross section as an example, two commercial silicon nitride microcantilever-based probes HYDRA2R-50NG-TL (without tips, produced by Applied NanoStructures, USA) having dimensions similar to the designed dimensions of the U-shaped cross section were selected as the processing object. As shown in FIG. 6, first, two second beams for supporting and fixing are milled from one of the two HYDRA2R-50NG-TL commercial probes by means of the focused ion beam milling. Then, the two second beams for supporting and fixing obtained by milling is attached to another uncut HYDRA2R-50NG-TL commercial probe (i.e., the first beam for reflecting the laser) by means of the focused ion beam deposition. Finally, the tip is bonded to the end of the micro-cantilever through the AB Glue (or UV light curable glue etc.) on the MFP-3D atomic force microscope to complete the fabrication of the probe.

Embodiment 4

The present embodiment provides a method for processing the microcantilever-based probe with the irregular cross section by the focused ion beam etching, which meets the requirements for the ultra-low friction coefficient measurement at the nanoscale single-point contact. In consideration of the probe processing convenience, taking a microcantilever-based probe with the U-shaped cross section as an example, a commercial silicon microcantilever-based probe FCL (without tip, produced by Applied NanoStructures, USA) having dimensions similar to the designed dimensions of a U-shaped cross section was selected as the processing object. As shown in FIG. 7, first, according to the calculation results, the area to be processed and the corresponding path of processing are determined. Then, a groove having the designed dimensions is etched and processed on the commercial probe by means of the focused ion beam etching technique to complete the processing of the micro-cantilever with a U-shaped cross section. Finally, the tip is bonded to the end of the micro-cantilever through the AB Glue (or UV light curable glue etc.) on the MFP-3D atomic force microscope to complete the fabrication of the probe.

As previously mentioned, the G of silicon is 50 GPa, the E of silicon is 169 GPa, the G of silicon nitride is 61 GPa, and the E of silicon nitride is 156 GPa. Thus, the G and E of silicon and silicon nitride are basically the same. The same designed dimension may be obtained through processing the silicon nitride micro-cantilever by means of the focused ion beam milling/deposition technique in Embodiment 3, as well as through processing the silicon microcantilever by means of the focused ion beam etching technique in the present embodiment.

Embodiment 5

Figure 9:
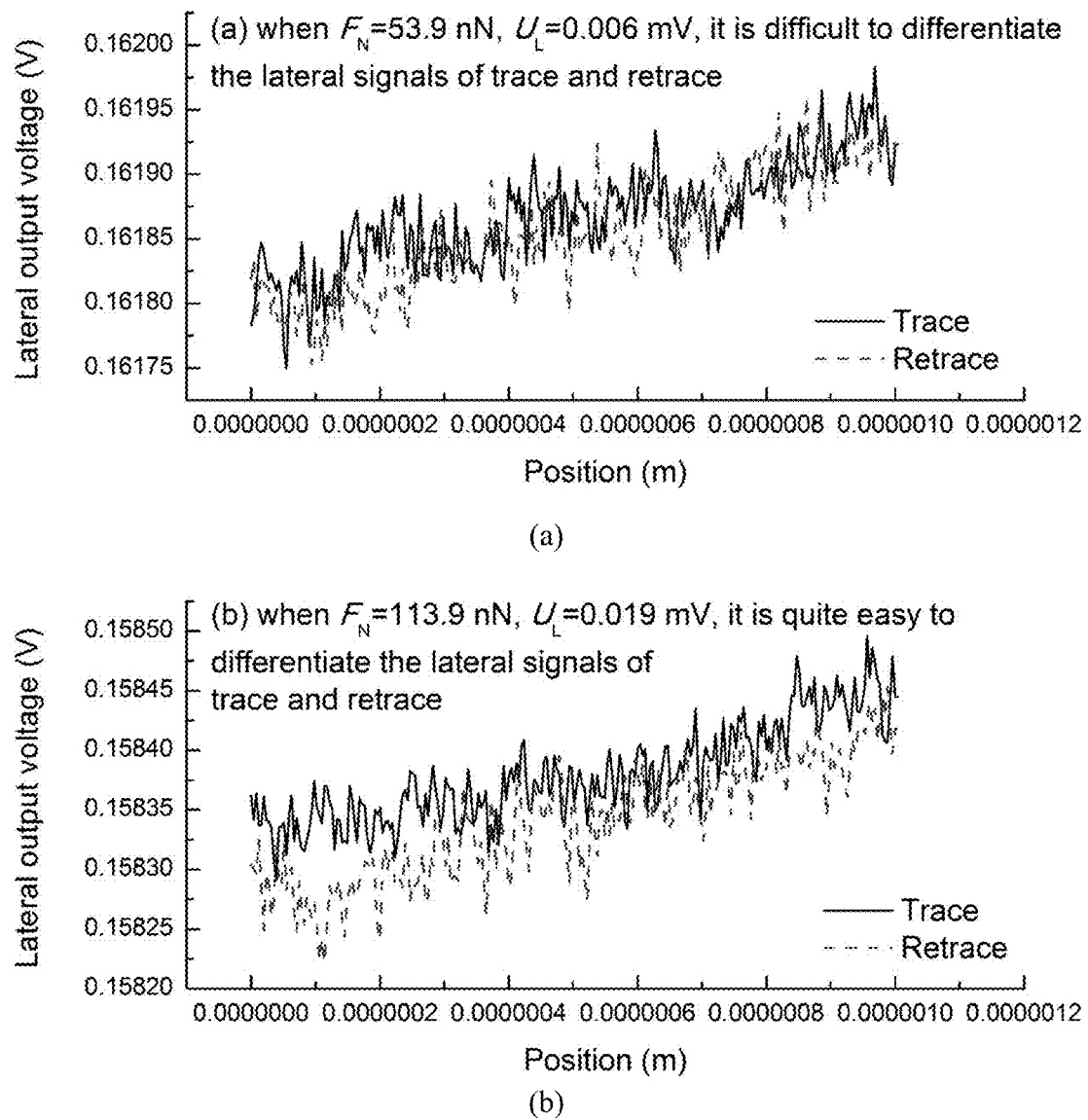
FIG. 9 shows a lateral output voltage $U_{trace}$ (solid line) and $U_{retrace}$ (dashed line) of a photodetector corresponding to a roundtrip path of a probe under different positive pressures by using an MFP-3D atomic force microscope provided by the embodiment, wherein $U_L=(U_{trace}-U_{retrace})/2$, (a) corresponds to $U_L=0.006$ mV, and (b) corresponds to $U_L=0.019$ mV.

As shown in FIG. 8, the present embodiment provides a micro-cantilever with a U-shaped cross-section having the designed dimensions obtained by processing with the focused ion beam etching technique in Embodiment 4. Then, a silica ball having a diameter of 23 μm is bonded to the end of the micro-cantilever with the U-shaped cross section by the glue to complete the fabrication of the probe. After that, the normal and torsional parameters are obtained by calibration. Specifically, the reciprocal of the normal optical lever sensitivity $InvOLS_N$ obtained by calibrating with the force curve on the silicon wafer is 145 nm/V. The normal elastic coefficient $K_N$ obtained by calibrating with the thermal noise method is 17 N/m. The torsional coefficient $K_T \times InvOLS_L$ obtained by calibrating with the wedge method is 1.2 μN/V. The voltage resolution $U_{Lmin}$ of the photodetector of the MFP-3D atomic force microscope is about 0.01 mV (as shown in FIG. 9, when $F_N$=53.9 nN, it is difficult to distinguish the lateral output voltages $U_{trace}$ (solid line) and $U_{retrace}$ (dashed line) of the photodetector corresponding to the roundtrip path of the probe, in this case, $U_L$=0.006 mV; and when $F_N$=113.9 nN, it is easy to distinguish the lateral output voltages $U_{trace}$ (solid line) and $U_{retrace}$ (dashed line) of the photodetector corresponding to the roundtrip path of the probe, in this case, $U_L$=0.019 mV, thus, in the present embodiment, it is believed that $U_{Lmin}$ is between 0.006 mV and 0.019 mV, rounded to 0.01 mV). The voltage measurement range $U_{Nmax}$ of the photodetector of the MFP-3D atomic force microscope is 20 V. As shown in equation (31) below:

$$\mu_{min} = \frac{K_T \times InvOLS_L \times U_{Lmin}}{K_N \times InvOLS_N \times U_{Nmax}}. \tag{31}$$

The parameters obtained from the calibration are put into the equation (31) and calculated to obtain the result that the friction coefficient resolution $\mu_{min}$ is $2 \times 10^{-7}$. The result is put into the equation (12) to calculate and obtain the result that the loadable maximum positive pressure $F_{Nmax}$ is 49 μN, which fully meet the measurement requirements in Embodiment 1 and Embodiment 2.

Thus, the irregular-shaped microcantilever-based probe fabricated according to the design and processing method proposed by the present invention can be applied in the ultra-low friction coefficient measurement at the nanoscale single-point contact in the superlubricity state of the sample.

The present invention provides a method for designing and processing the microcantilever-based probe with the irregular cross section applied in the ultra-low friction coefficient measurement at the nanoscale single-point contact, which greatly improves the resolution for the friction coefficient measurement, realizes the ultra-low friction coefficient measurement with the resolution in the magnitude that is equal to or less than $10^{-6}$, ensures the authenticity and reliability of the quantitative analysis in the superlubricity process, and provides an important measurement means for the establishment of the superlubricity theory and the application of the superlubricity technology in important fields such as the aerospace field, the advanced manufacturing field and the energy field in China.

What is claimed is:

1. A method of making a microcantilever-based probe having a micro-cantilever with an irregular cross section, the microcantilever-based probe is used in an atomic force microscope and applied in an ultra-low friction coefficient measurement at a nanoscale single-point contact, wherein an axis of the microcantilever-based probe with the irregular cross section is a straight line, and a uniform cross section is provided along a direction of the axis; the uniform cross section is the irregular cross section composed of a plurality of rectangles having an equal wall thickness; the method of making the microcantilever-based probe comprises the following steps:

step (1): establishing a universal theoretical model of a friction coefficient measurement using the microcantilever-based probe, wherein a friction force and a positive pressure are respectively measured by a torsion and a bending of the microcantilever-based probe according to a measurement principle of the atomic force microscope, namely, $$F_L = K_T \times InvOLS_L \times U_L \tag{1},$$

$$F_N = K_N \times InvOLS_N \times U_N \tag{2},$$

wherein $F_L$ and $F_N$ refer to the friction force and the positive pressure, respectively; $K_T$ and $K_N$ refer to a torsional elastic coefficient and a normal elastic coefficient of the microcantilever-based probe, respectively; $InvOLS_L$ and $InvOLS_N$ refer to a reciprocal of a lateral optical lever sensitivity and a reciprocal of a normal optical lever sensitivity, respectively; $U_L$ and $U_N$ refer to a lateral output voltage and a normal output voltage of a photodetector; and the universal theoretical model of the friction coefficient measurement using the microcantilever-based probe is then established, as shown in the following equation:

$$\mu = \frac{F_L}{F_N} = \frac{K_T \times InvOLS_L \times U_L}{K_N \times InvOLS_N \times U_N}, \tag{3}$$

wherein μ is the friction coefficient;

step (2): establishing a specific theoretical model of the friction coefficient measurement using the microcantilever-based probe with the irregular cross section, wherein according to a measurement principle of an optical path system, the reciprocal of the lateral optical lever sensitivity $InvOLS_L$ and the reciprocal of the normal optical lever sensitivity $InvOLS_N$ are expressed as follows:

$$InvOLS_L = \frac{H/\alpha_L}{4dU_{sum}/\alpha_{sum}}, \quad (4)$$

$$InvOLS_N = \frac{Hl/\alpha_N}{6dU_{sum}/\alpha_{sum}}, \quad (5)$$

wherein H is a length of a photosensitive surface of the photodetector; d is a length of an optical path; l is a length of the micro-cantilever; $U_{sum}$ is a total voltage generated by a laser in four quadrants of the photodetector; and $\alpha_{sum}$, $\alpha_L$, and $\alpha_N$ respectively refer to magnification times of a total output current, a lateral output current, and a normal output current of the photodetector subjected to a current/voltage converter, with a unit of V/A;

based on an elastic mechanics and material mechanics theory of thin plates, the torsional elastic coefficient $K_T$ of the microcantilever-based probe with the irregular cross section is expressed as follows:

$$K_T = \frac{F_L}{\varphi_{tip}} = \frac{G \times I_t}{(h_{tip} + e_1) \times l}, \quad (6)$$

wherein $\varphi_{tip}$ is a torsion angle of the microcantilever-based probe with the irregular cross section under an action of the friction force $F_L$; G is a shear modulus of a material of the micro-cantilever; $I_t$ is a torsional inertia moment of the irregular cross section, $h_{tip}$ is a tip height, $e_1$ is a distance from a centroid of the irregular cross section to a bottom side;

the normal elastic coefficient $K_N$ of the microcantilever-based probe with the irregular cross section is expressed as follows:

$$K_N = \frac{F_N}{\upsilon_{tip}} = \frac{3E \times I_{x_C}}{l^3}, \quad (7)$$

wherein $\upsilon_{tip}$ is a deflection of the microcantilever-based probe with the irregular cross section under an action of the positive pressure $F_N$; E is an elastic modulus of the material of the micro-cantilever; $I_{x_C}$ is an inertia moment of the irregular cross section to a neutral axis $x_C$;

the equations (4)-(7) are put into the universal theoretical model (3) established in the step (1) to calculate and obtain the specific theoretical model for measuring the friction coefficient of the microcantilever-based probe with the irregular cross section, as shown in the following equation:

$$\mu = \frac{G \times l}{2E \times (h_{tip} + e_1)} \times \frac{I_t}{I_{x_C}} \times \frac{I_L}{I_N}, \quad (8)$$

wherein $I_L$ is the lateral output current of the photodetector, and $I_L = U_L/\alpha_L$; $I_N$ is the normal output current of the photodetector, and $I_N = U_N/\alpha_N$; and step (3): designing the microcantilever-based probe with the irregular cross section meeting measurement requirements for an ultra-low friction coefficient, wherein according to the step (2), assuming that μ is a friction coefficient resolution $μ_{min}$, and $F_N$ is a loadable maximum positive pressure $F_{Nmax}$, or $F_L$ is a measurable minimum friction force $F_{Lmin}$; combined with constraint conditions of the friction coefficient resolution $μ_{min}$, the loadable maximum positive pressure $F_{Nmax}$ or the measurable minimum friction force $F_{Lmin}$, characteristics of the atomic force microscope, the equations (1)-(8) are considered to calculate and design dimensions of the microcantilever-based probe with the irregular cross section to meet the measurement requirements; the designed dimensions comprise the length l of the micro-cantilever, a width $w_i$ of an i-th sub-rectangle constituting the irregular cross section, and a wall thickness t;

the microcantilever-based probe measures the ultra-low friction coefficient with a resolution in a magnitude that is equal to or less than $10^{-6}$ in the nanoscale single-point contact in a superlubricity state in lubricating material applications.

2. The method of making the microcantilever-based probe according to claim 1, wherein the micro-cantilever with the irregular cross section comprises a first beam for reflecting laser and a second beam fixedly connected to the first beam for supporting and fixing.

3. The method of making the microcantilever-based probe according to claim 2, wherein a shape of the irregular cross section is selected from the group consisting of a hollow rectangular shape, an I shape, an H shape, an inverted T shape, and a U shape; the irregular cross section comprises a horizontal side constituting the first beam and a vertical side constituting the second beam; at least one horizontal side and at least one vertical side are provided; and the horizontal side and the vertical side are rectangles with an equal wall thickness.

4. The method of making the microcantilever-based probe according to claim 1, wherein in the step (2), when $h_{tip}$ is ten times greater than $e_1$, the specific theoretical model is simplified as follows:

$$\mu = \frac{G \times l}{2E \times h_{tip}} \times \frac{I_t}{I_{x_C}} \times \frac{I_L}{I_N}. \quad (9)$$

5. The method of making the microcantilever-based probe according to claim 4, wherein the step (3) comprises the following sub-steps:

step (3a) based on a set friction coefficient resolution $μ_{min}$, calculating and obtaining a quantitative relationship 1 of the length l of the micro-cantilever with the irregular cross section, the torsional inertia moment $I_t$, and the inertia moment $I_{x_C}$ to the neutral axis $x_C$ according to the equation (8) or (9);

step (3b) based on the loadable maximum positive pressure $F_{Nmax}$ or the measurable minimum friction force $F_{Lmin}$, calculating and obtaining a quantitative relationship 2 of the length l of the micro-cantilever with the irregular cross section, the torsional inertia moment $I_t$, or/and the inertia moment $I_{x_C}$ to the neutral axis $x_C$ according to according to the equations (1)-(7);

step (3c) obtaining a relationship between the torsional inertia moment $I_t$, the inertia moment $I_{x_C}$ to the neutral axis $x_C$ and the width $w_i$ of the i-th sub-rectangle constituting the irregular cross section, the wall thickness t according to structural parameters of the microcantilever with the irregular cross section; putting the relationship into the quantitative relationship 1 and the quantitative relationship 2 of l, $I_t$ and $I_{xC}$ obtained in the step (3a) and the step (3b) respectively to obtain a quantitative relationship 1' and a quantitative relationship 2' of l, $w_i$, and t, the width $w_i$ of the i-th sub-rectangle comprises a width $w_R$ of the first beam for reflecting the laser and a width $w_H$ of the second beam for supporting and fixing;

step (3d) calculating and obtaining value ranges of the length l of the micro-cantilever with the irregular cross section, the width $w_i$ of the i-th sub-rectangle, and the wall thickness t; and step (3e) setting at least two parameters of the length l of the micro-cantilever with the irregular cross section, the width $w_i$ of the i-th segment rectangle, and the wall thickness t according to the value ranges of the length l of the micro-cantilever with the irregular cross section, the width $w_i$ of the i-th sub-rectangle and the wall thickness t; and calculating and obtaining remaining unknown parameter of the length l of the micro-cantilever with the irregular cross section, the width $w_i$ of the i-th sub-rectangle, and the wall thickness t to obtain the designed dimensions of the microcantilever-based probe with the irregular cross section according to the quantitative relationship 1' and/or the quantitative relationship 2'.

6. The method of making the microcantilever-based probe according to claim 5, wherein in the step (3), the designed dimensions of the microcantilever-based probe with the irregular cross section are put into a finite element simulation model to determine whether key indexes of a friction coefficient measurement meet the measurement requirements or not, the key indexes comprise the friction coefficient resolution, the loadable maximum positive pressure or the measurable minimum friction force, a maximum stress, and a resonance frequency; if the key indexes meet the measurement requirements, the designed dimensions of the microcantilever-based probe with the irregular cross section are determined; if the key indexes do not meet the measurement requirements, the material or/and a reflective surface coating of the micro-cantilever with the irregular cross section are changed, and then go back to the step (3); or the atomic force microscope is changed, and then go back to the step (3) until the key indexes of the friction coefficient measurement meet the measurement requirements.

7. The method of making the microcantilever-based probe according to claim 2, wherein in the step (2), when $h_{tip}$ is ten times greater than $e_1$, the specific theoretical model is simplified as follows:

$$\mu = \frac{G \times l}{2E \times h_{tip}} \times \frac{I_t}{I_{xC}} \times \frac{I_L}{I_N}. \quad (9)$$

8. The method of making the microcantilever-based probe according to claim 3, wherein in the step (2), when $h_{tip}$ is ten times greater than $e_1$, the specific theoretical model is simplified as follows:

$$\mu = \frac{G \times l}{2E \times h_{tip}} \times \frac{I_t}{I_{xC}} \times \frac{I_L}{I_N}. \quad (9)$$

9. The method of making the microcantilever-based probe according to claim 7, wherein the step (3) comprises the following sub-steps:

step (3a) based on a set friction coefficient resolution $\mu_{min}$, calculating and obtaining a quantitative relationship 1 of the length l of the micro-cantilever with the irregular cross section, the torsional inertia moment $I_t$, and the inertia moment $I_{xC}$ to the neutral axis $x_C$ according to the equation (8) or (9);

step (3b) based on the loadable maximum positive pressure $F_{Nmax}$ or the measurable minimum friction force $F_{Lmin}$, calculating and obtaining a quantitative relationship 2 of the length l of the micro-cantilever with the irregular cross section, the torsional inertia moment $I_t$, or/and the inertia moment $I_{xC}$ to the neutral axis $x_C$ according to according to the equations (1)-(7);

step (3c) obtaining a relationship between the torsional inertia moment $I_t$, the inertia moment $I_{xC}$ to the neutral axis xC and the width $w_i$ of the i-th sub-rectangle constituting the irregular cross section, the wall thickness t according to structural parameters of the micro-cantilever with the irregular cross section; putting the relationship into the quantitative relationship 1 and the quantitative relationship 2 of l, $I_t$ and $I_{xC}$ obtained in the step (3a) and the step (3b) respectively to obtain a quantitative relationship 1' and a quantitative relationship 2' of l, $w_i$ and t, the width $w_i$ of the i-th sub-rectangle comprises a width $w_R$ of the first beam for reflecting the laser and a width $w_H$ of the second beam for supporting and fixing;

step (3d) calculating and obtaining value ranges of the length l of the micro-cantilever with the irregular cross section, the width $w_i$ of the i-th sub-rectangle, and the wall thickness t; and step (3e) setting at least two parameters of the length l of the micro-cantilever with the irregular cross section, the width $w_i$ of the i-th segment rectangle, and the wall thickness t according to the value ranges of the length l of the micro-cantilever with the irregular cross section, the width $w_i$ of the i-th sub-rectangle and the wall thickness t; and calculating and obtaining remaining unknown parameter of the length l of the micro-cantilever with the irregular cross section, the width $w_i$ of the i-th sub-rectangle, and the wall thickness t to obtain the designed dimensions of the microcantilever-based probe with the irregular cross section according to the quantitative relationship 1' and/or the quantitative relationship 2'.

10. The method of making the microcantilever-based probe according to claim 8, wherein the step (3) comprises the following sub-steps:

step (3a) based on a set friction coefficient resolution $\mu_{min}$, calculating and obtaining a quantitative relationship 1 of the length l of the micro-cantilever with the irregular cross section, the torsional inertia moment $I_t$, and the inertia moment $I_{xC}$ to the neutral axis $x_C$ according to the equation (8) or (9);

step (3b) based on the loadable maximum positive pressure $F_{Nmax}$ or the measurable minimum friction force $F_{Lmin}$, calculating and obtaining a quantitative relationship 2 of the length l of the micro-cantilever with the irregular cross section, the torsional inertia moment $I_t$, or/and the inertia moment $I_{xC}$ to the neutral axis $x_C$ according to according to the equations (1)-(7);

step (3c) obtaining a relationship between the torsional inertia moment $I_t$, the inertia moment $I_{xC}$ to the neutral axis $x_C$ and the width $w_i$ of the i-th sub-rectangle constituting the irregular cross section, the wall thickness t according to structural parameters of the micro-cantilever with the irregular cross section; putting the relationship into the quantitative relationship 1 and the quantitative relationship 2 of l, $I_r$ and $I_{xC}$ obtained in the step (3a) and the step (3b) respectively to obtain a quantitative relationship 1' and a quantitative relationship 2' of l, $w_i$ and t, the width $w_i$ of the i-th sub-rectangle comprises a width $w_R$ of the first beam for reflecting the laser and a width $w_H$ of the second beam for supporting and fixing;

step (3d) calculating and obtaining value ranges of the length l of the micro-cantilever with the irregular cross section, the width $w_i$ of the i-th sub-rectangle, and the wall thickness t; and step (3e) setting at least two parameters of the length l of the micro-cantilever with the irregular cross section, the width $w_i$ of the i-th segment rectangle, and the wall thickness t according to the value ranges of the length l of the micro-cantilever with the irregular cross section, the width $w_i$ of the i-th sub-rectangle and the wall thickness t; and calculating and obtaining remaining unknown parameter of the length l of the micro-cantilever with the irregular cross section, the width $w_i$ of the i-th sub-rectangle, and the wall thickness t to obtain the designed dimensions of the microcantilever-based probe with the irregular cross section according to the quantitative relationship 1' and/or the quantitative relationship 2'.

11. The method of making the microcantilever-based probe according to claim 9, wherein in the step (3), the designed dimensions of the microcantilever-based probe with the irregular cross section are put into a finite element simulation model to determine whether key indexes of a friction coefficient measurement meet the measurement requirements or not, the key indexes comprise the friction coefficient resolution, the loadable maximum positive pressure or the measurable minimum friction force, a maximum stress, and a resonance frequency; if the key indexes meet the measurement requirements, the designed dimensions of the microcantilever-based probe with the irregular cross section are determined; if the key indexes do not meet the measurement requirements, the material or/and a reflective surface coating of the micro-cantilever with the irregular cross section are changed, and then go back to the step (3); or the atomic force microscope is changed, and then go back to the step (3) until the key indexes of the friction coefficient measurement meet the measurement requirements.

12. The method of making the microcantilever-based probe according to claim 10, wherein in the step (3), the designed dimensions of the microcantilever-based probe with the irregular cross section are put into a finite element simulation model to determine whether key indexes of a friction coefficient measurement meet the measurement requirements or not, the key indexes comprise the friction coefficient resolution, the loadable maximum positive pressure or the measurable minimum friction force, a maximum stress, and a resonance frequency; if the key indexes meet the measurement requirements, the designed dimensions of the microcantilever-based probe with the irregular cross section are determined; if the key indexes do not meet the measurement requirements, the material or/and a reflective surface coating of the micro-cantilever with the irregular cross section are changed, and then go back to the step (3); or the atomic force microscope is changed, and then go back to the step (3) until the key indexes of the friction coefficient measurement meet the measurement requirements.

13. The method of making the microcantilever-based probe according to claim 1, comprising the following steps:
obtaining the designed dimensions of the microcantilever-based probe with the irregular cross section;
processing to obtain the micro-cantilever with the irregular cross section; and
installing a tip at an end of the micro-cantilever.

14. The method of making the microcantilever-based probe according to claim 13, wherein a commercial probe having dimensions similar to the designed dimensions of the microcantilever-based probe with the irregular cross section is taken as a processing object; and the microcantilever-based probe with the irregular cross section is processed by a focused ion beam technique.

15. The method of making the microcantilever-based probe according to claim 14, wherein the focused ion beam technique comprises at least one selected from the group consisting of a focused ion beam milling, a focused ion beam deposition and a focused ion beam etching.

16. The method of making the microcantilever-based probe according to claim 15, wherein the method comprises the following steps,
step (1'): processing a first beam for reflecting laser and a second beam for supporting and fixing by the focused ion beam milling;
step (2'): attaching the second beam for supporting and fixing obtained from the milling to the first beam for reflecting laser by the focused ion beam deposition; and
step (3'): bonding the tip to the end of the micro-cantilever after processing to complete fabrication of the probe.

17. The method of making the microcantilever-based probe according to claim 15, wherein the method comprises the following steps,
step (1"): obtaining the micro-cantilever with the irregular cross section having the designed dimensions by the focused ion beam etching; and
step (2"): bonding the tip to the end of the micro-cantilever after processing to complete the fabrication of the probe.

18. The method of making the microcantilever-based probe according to claim 13, wherein a material of the tip is at least one selected from the group consisting of silicon, silicon nitride, silicon dioxide, diamond, diamond-like material, aluminum oxide, zirconium dioxide, titanium dioxide, cerium oxide, graphite, gold and graphene, molybdenum disulfide, and hexagonal boron nitride.

19. The method of making the microcantilever-based probe according to claim 13, wherein the microcantilever-based probe with the irregular cross section is applied in the ultra-low friction coefficient measurement at the nanoscale single-point contact under the superlubricity state of a sample.

20. The method of making the microcantilever-based probe according to claim 13, wherein the micro-cantilever with the irregular cross section comprises a first beam for reflecting laser and a second beam fixedly connected to the first beam for supporting and fixing.

* * * * *